US012656584B2

(12) United States Patent
Katsuragi

(10) Patent No.: US 12,656,584 B2
(45) Date of Patent: Jun. 16, 2026

(54) IMAGING LENS ASSEMBLY, CAMERA MODULE AND IMAGING DEVICE

(71) Applicant: GUANGDONG OPPO MOBILE TELECOMMUNICATIONS CORP., LTD., Dongguan (CN)

(72) Inventor: Daigo Katsuragi, Yokohama (JP)

(73) Assignee: GUANGDONG OPPO MOBILE TELECOMMUNICATION CORP., LTD., Dongguan (CN)

( * ) Notice: Subject to any disclaimer, the term of this patent is extended or adjusted under 35 U.S.C. 154(b) by 325 days.

(21) Appl. No.: 18/526,988

(22) Filed: Dec. 1, 2023

(65) Prior Publication Data

US 2024/0134168 A1 Apr. 25, 2024

Related U.S. Application Data

(63) Continuation of application No. PCT/CN2021/098016, filed on Jun. 2, 2021.

(51) Int. Cl.
*G02B 13/00* (2006.01)

(52) U.S. Cl.
CPC ....... *G02B 13/0065* (2013.01); *G02B 13/004* (2013.01)

(58) Field of Classification Search
CPC .............. G02B 13/0065; G02B 13/004; G02B 13/0045
See application file for complete search history.

(56) References Cited

U.S. PATENT DOCUMENTS

2014/0185152 A1* 7/2014 Miyazaki ............... G03B 17/04
359/823
2021/0041765 A1* 2/2021 Shigemitsu ............ G03B 17/17

FOREIGN PATENT DOCUMENTS

| | | | | | |
|---|---|---|---|---|---|
| CN | 1881000 | A | 12/2006 | | |
| CN | 101581826 | A | 11/2009 | | |
| CN | 201732203 | U | 2/2011 | | |
| CN | 206421098 | U | * | 8/2017 | |
| CN | 111123490 | A | 5/2020 | | |
| CN | 112612126 | A | 4/2021 | | |
| CN | 112887563 | A | * | 6/2021 | ............. H04N 23/67 |
| JP | 2007068063 | A | 3/2007 | | |

OTHER PUBLICATIONS

International Search Report and Written Opinion, International Patent Application No. PCT/CN2021/098016, mailed Feb. 28, 2022 (10 pages).
Chinese First Office Action, Chinese Application No. 202180098437.1, mailed Apr. 17, 2026 (17 pages).

* cited by examiner

*Primary Examiner* — Ephrem Z Mebrahtu
(74) *Attorney, Agent, or Firm* — Ladas & Parry LLP

(57) ABSTRACT

An imaging lens assembly includes a first lens group for shooting at a short focal length, a second lens group for shooting at a long focal length, a third lens group for shooting at the short focal length and the long focal length, a first minor positioned between the first lens group and the third lens group; and a second mirror positioned between the second lens group and the third lens group. The first lens group and second lens group change its position in an optical axis direction between a shooting state and a lens storage state. The first minor or second mirror forms an optical path optically connecting a corresponding lens group and the third lens group. The first minor or second minor secure a storage space for the corresponding lens group.

13 Claims, 22 Drawing Sheets

IMAGING LENS ASSEMBLY, CAMERA MODULE AND IMAGING DEVICE

CROSS-REFERENCE TO RELATED APPLICATIONS

This application is a continuation-application of International (PCT) Patent Application No. PCT/CN2021/098016 filed on Jun. 2, 2021, the content of which are herein incorporated by reference in their entireties.

TECHNICAL FIELD

The present disclosure relates to an imaging lens assembly, a camera module, and an imaging device, and more specifically, to an imaging lens assembly, a camera module, and an imaging device that are small and enable good optical performance.

BACKGROUND

In recent years, portable imaging devices such as mobile phones and digital cameras are being widely used. With the recent miniaturization of imaging devices, the imaging lens assembly mounted on such imaging devices also requires downsizing. In order to meet such a demand for miniaturization, a conventional imaging lens assembly secures a focal length of the imaging lens assembly within a restricted space by positioning a prism on an object side of a lens group.

However, in the case of conventional imaging lenses, it is difficult to compactly mount a plurality of collapsible optical systems having different focal lengths.

SUMMARY

The present disclosure needs to provide an imaging lens assembly, a camera module, and an imaging device.

In accordance with the present disclosure, an imaging lens assembly includes:

a first lens group for shooting at a short focal length;

a second lens group for shooting at a long focal length;

a third lens group for shooting at the short focal length and the long focal length;

a first mirror positioned between the first lens group and the third lens group; and a second minor positioned between the second lens group and the third lens group, wherein at least one of the first lens group and the second lens group is configured to change its position in an optical axis direction between a shooting state and a lens storage state, the first mirror or the second mirror is configured to form an optical path optically connecting a corresponding lens group, which is among the first lens group and the second lens group, and the third lens group, by tilting with respect to both of an optical axis direction of the corresponding lens group and an optical axis direction of the third lens group in the shooting state, and the first mirror and the second minor are configured to secure a storage space for the corresponding lens group by being substantially perpendicular to the optical axis direction of the corresponding lens group in the lens storage state.

In accordance with the present disclosure, a camera module includes: the imaging lens assembly, having a first shooting state, a second shooting state, and a lens storage state, the second shooting state having a focus length longer than that of the first shooting state, and the imaging lens assembly comprising: a first lens group, having a first optical axis; a second lens group, having a second optical axis; a third lens group, having a third optical axis, the third optical axis intersecting with both the first optical axis and the second optical axis; a first minor, positioned between first lens group and the third lens group; and a second mirror, positioned between the second lens group and the third lens group, wherein when the imaging lens assembly is in the first shooting state, the first minor configured to form an optical path optically connecting the first lens group and the third lens group by tilting with respect to both the first optical axis and the third optical axis; when the imaging lens assembly is in the second shooting state, the second mirror configured to form an optical path optically connecting the second lens group and the third lens group by tilting with respect to both the second optical axis and the third optical axis; and when the imaging lens assembly is in the lens storage state, the first minor is substantially perpendicular to the first optical axis, and the second minor is substantially perpendicular to the second optical axis; and an image sensor including an imaging surface.

In accordance with the present disclosure, an imaging device includes: the camera module, comprising: an imaging lens assembly, comprising: a first lens group configured to shoot at a short focal length; a second lens group configured to shoot at a long focal length; a third lens group configured to shoot at the short focal length and the long focal length; a first mirror positioned between the first lens group and the third lens group; and a second mirror positioned between the second lens group and the third lens group, at least one of the first lens group and the second lens group being configured to change its position in an optical axis direction between a shooting state and a lens storage state, the first minor or the second minor is configured to form an optical path optically connecting a corresponding lens group, which is among the first lens group and the second lens group, and the third lens group, by tilting with respect to both of an optical axis direction of the corresponding lens group and an optical axis direction of the third lens group in the shooting state, and the first mirror and the second minor are configured to secure a storage space for the corresponding lens group by being substantially perpendicular to the optical axis direction of the corresponding lens group in the lens storage state; and an image sensor comprising an imaging surface; and a housing for storing the imaging lens assembly.

BRIEF DESCRIPTION OF THE DRAWINGS

These and/or other aspects and advantages of the embodiments of the present disclosure will become apparent and more readily appreciated from the following descriptions made with reference to the drawings, in which.

DETAILED DESCRIPTION

Figure 1:
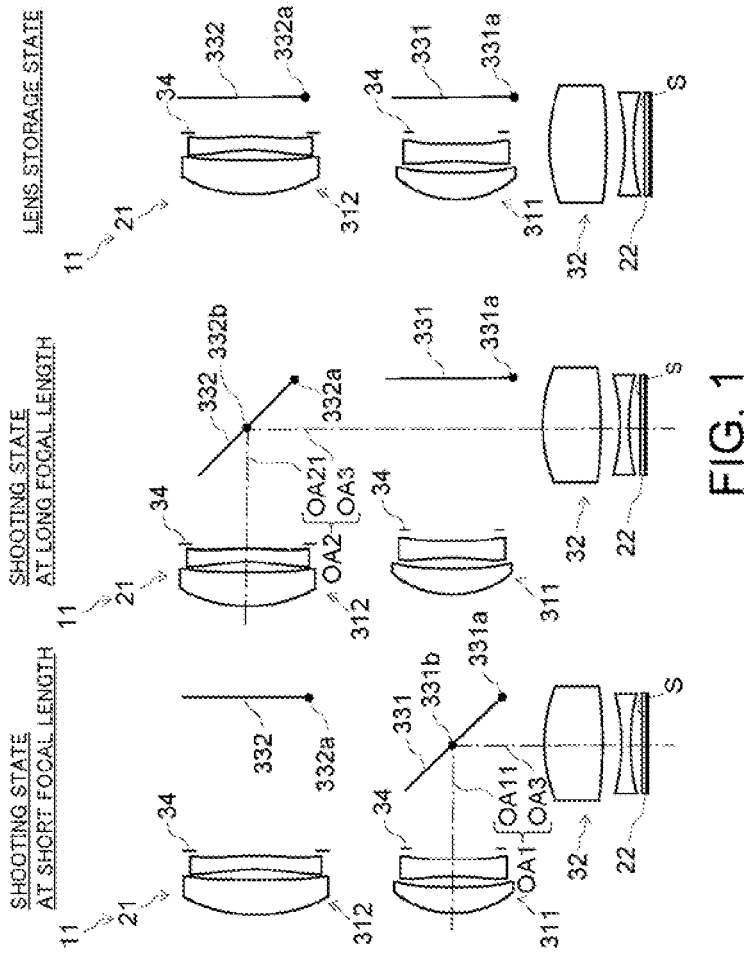
FIG. 1 is a diagram of a camera module according to the present disclosure illustrating a first front lens group and a second front lens group which change their position in optical axis directions between a shooting state and a lens storage state, and a first minor and a second mirror which change their angle with respect to the optical axis directions between the shooting state and the lens storage state.

Embodiments of the present disclosure will be described in detail and examples of the embodiments will be illustrated in the accompanying drawings. The same or similar elements and elements having same or similar functions are denoted by like reference numerals throughout the descriptions. The embodiments described herein with reference to the drawings are explanatory and aim to illustrate the present disclosure, but they shall not be construed to limit the present disclosure.

Outline of the Disclosure

First, an outline of the present disclosure will be described. As shown in FIG. 1, a camera module 11 to which the present disclosure applies, is a collapsible camera module with a compact configuration in which a plurality of optical systems having different focal lengths partially share their elements. Specifically, as shown in FIG. 1, an imaging lens assembly 21 of the camera module 11 includes a first front lens group 311 (i.e., a first lens group) for shooting at a short focal length or a wide-angle shooting, a second front lens group 312 (i.e., a second lens group) for shooting at a long focal length or a telephoto shooting, and a rear lens group 32 (i.e., a third lens group) for shooting at the short focal length and the long focal length. The second front lens group 312 is disposed farther from an imaging surface S than the first front lens group 311.

The camera module 11 is configured to change positions of the first front lens group 311 and the second front lens group 312, in optical axis directions, between a shooting state where a subject (object) is shot (recorded as an image) and a lens storage state where the imaging lens assembly 21 is stored in a housing of the camera module 11. The camera module 11 is also configured to change, whether or not an optical path which optically connects the first front lens group 311 and a rear lens group 32 and an optical path which optically connects the second front lens group 312 and a rear lens group 32 are formed, between the shooting state and the lens storage state. Whether or not the optical paths are formed depends on an angle of a first minor 331 disposed between the first front lens group 311 and the rear lens group 32, and an angle of a second mirror 332 disposed between the second front lens group 312 and the rear lens group 32. The optical axis directions of the first front lens group 311 and the second front lens group 312 are parallel to each other and perpendicular to an optical axis direction of the rear lens group 32. The first minor 331 is rotatable about one end 331*a* on the rear lens group 32 side of the first mirror 331. The second mirror 332 is rotatable about one end 332*a* on the rear lens group 32 side of the second mirror 332. In the FIG. 1, dash-dot lines represent the optical axes of the camera modules 11 (hereinafter the same applies).

As shown in FIG. 1, the camera modules 11 includes a first optical axis OA1, which is an optical axis of an optical system of the short focal length side, and a second optical axis OA2 which is an optical axis of an optical system of the long focal length side.

The first optical axis OA1 includes an optical axis OA11 of the first front lens group 311 and an optical axis OA3 of the rear lens group 32. The optical axis OA11 of the first front lens group 311 and the optical axis OA3 of the rear lens group 32 are continuous with each other at an intersection 331*b* with the first minor 331.

The second optical axis OA2 includes an optical axis OA21 of the second front lens group 312 and the optical axis OA3 of the rear lens group 32. The optical axis OA21 of the second front lens group 312 and the optical axis OA3 of the rear lens group 32 are continuous with each other at an intersection 332*b* with the second minor 332.

At least one of the first front lens group 311 and the second front lens group 312 is configured to change its position in an optical axis direction between a shooting state and a lens storage state.

The first mirror 331 or the second mirror 332 is configured to tilt with respect to both of an optical axis direction of a corresponding lens group, which is among the first front lens group 311 and the second front lens group 312, and an optical axis direction of the rear lens group 32 in the shooting state. As a result, the first minor 331 or the second minor 332 is configured to form an optical path optically connecting the corresponding lens group and the rear lens group 32 in the shooting state.

The first mirror 331 and the second minor 331 is configured to be substantially perpendicular to the optical axis direction of the corresponding lens group in the lens storage state. As a result, the first minor 331 and the second minor 331 is configured to secure a storage space for the corresponding lens group in the lens storage state.

Figure 2:
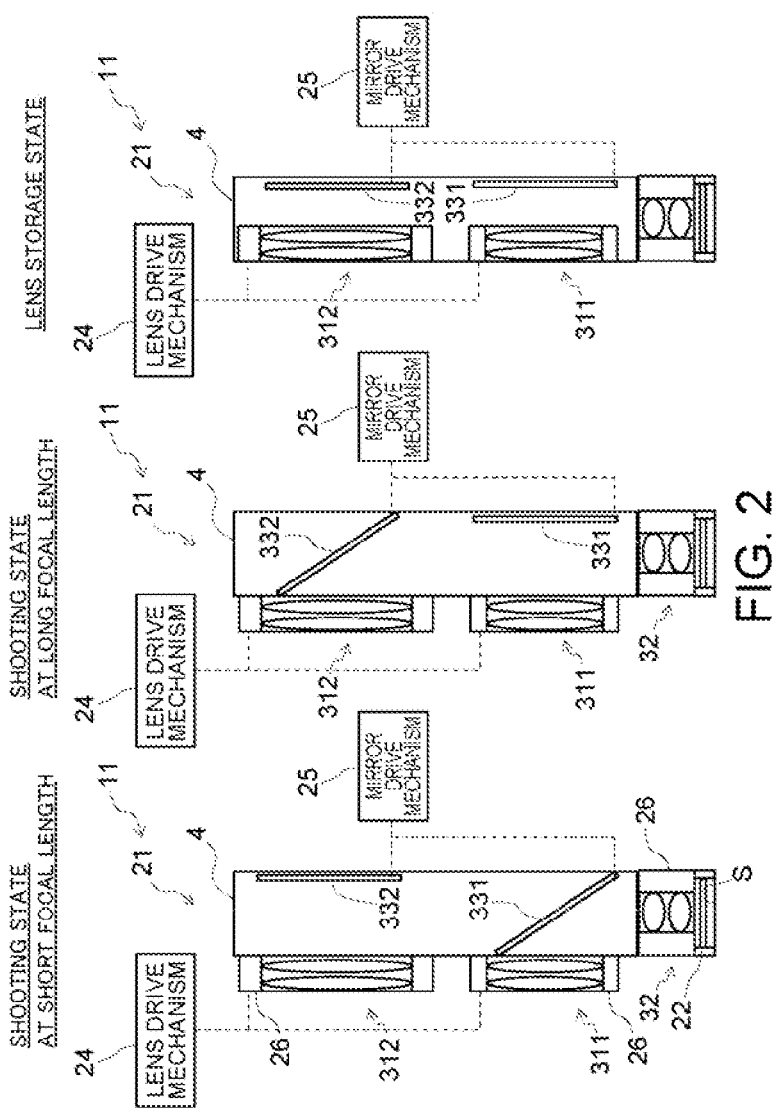
FIG. 2 is a diagram of a camera module according to the present disclosure illustrating a mechanism which changes the positions of the first front lens group and the second lens group in the optical axis directions, and a mechanism which changes the angles of the first minor and the second mirror with respect to the optical axis directions.

More specifically, as shown in FIG. 2, the first front lens group 311 and the second front lens group 312 are stored in the housing 4 in the lens storage state. Further, the first mirror 331 is perpendicular to the optical axis direction of the first front lens group 311 in order to secure a storage space of the first front lens group 311. Further, the second mirror 332 is perpendicular to the optical axis direction of the second front lens group 312 in order to secure a storage space of the second front lens group 312. The first front lens group 311 and the second front lens group 312 are held in barrels 26.

Then, the camera module 11 switches from the lens storage state to the shooting state when a predetermined user operation, which starts a shooting mode, is performed. As shown in FIG. 2, the camera module 11 pushes out the first front lens group 311 and the second front lens group 312 stored in the housing 4 in a direction protruding from the housing 4, the direction being opposite to the first mirror 331 and the second mirror 332, by using a lens drive mechanism 24 during the switching from the lens storage state to the shooting state. Herein, the direction opposite to the first minor 331 and the second mirror 332 may refer to a direction away from the first mirror 331 and the second minor 332. The drive mechanism 24 may be an actuator such as a voice coil motor provided in association with each of the first front lens group 311 and the second front lens group 312.

Further, the camera module 11 drives the first mirror 331 or the second minor 332 so as to form the optical path optically connecting the first front lens group 311 and the rear lens group 32 or the optical path optically connecting the second front lens group 312 and the rear lens group 32, by using a mirror drive mechanism 25. There may be a time lag between the extension of the first front lens group 311 and the second front lens group 312 and the drive of the first mirror 331 or the second mirror 332.

More specifically, the minor driving mechanism 25 rotates the first mirror 331 toward the first front lens group 311 side and tilts the first minor 331 with respect to both of the optical axis direction of the first front lens group 311 and the optical axis direction of the rear lens group 32 when the shooting state is a state of shooting at the short focal length (i.e., wide-angle shooting). As a result, an optical path optically connecting the first front lens group 311 and the rear lens group 32 is formed as an optical path of the short focal length side. At this time, the minor driving mechanism 25 maintains the second mirror 332 in a state perpendicular to the optical axis direction of the second front lens group 312.

The mirror driving mechanism 25 rotates the second mirror 332 toward the second front lens group 312 side and tilts the second minor 332 with respect to both of the optical axis direction of the second front lens group 312 and the optical axis direction of the rear lens group 32 when the shooting state is a state of shooting at the long focal length (i.e., the telephoto shooting). As a result, an optical path optically connecting the second front lens group 312 and the rear lens group 32 is formed as an optical path of the long focal length side. At this time, the mirror driving mechanism 25 maintains the first mirror 331 in a state perpendicular to the optical axis direction of the first front lens group 311 in order not to interfere with the optical path optically connecting the second front lens group 312 and the rear lens group 32.

The mirror driving mechanism 25 may be an actuator such as a motor provided in association with each of the first minor 331 and the second minor 332.

On the other hand, the camera module 11 switches from the shooting state to the lens storage state when a predetermined user operation, which ends the shooting mode, is performed. The lens drive mechanism 24 retracts and stores the front lens group 311, 312 in the housing 4 during the switching from the shooting state to the lens storage state.

At this time, the mirror drive mechanism 25 drives the first minor 331 or the second mirror 332 so as to not form the optical path optically connecting the corresponding front lens group and the rear lens group 32.

More specifically, the minor drive mechanism 25 rotates the first mirror 331 toward an opposite side of the first front lens group 311 to make the first mirror 331 (herein, the opposite side of the first front lens group 311 refers to the side of the first mirror 331 away from the first front lens group 311) perpendicular to the optical axis direction of the first lens group 311 when the camera module 11 switches from the state of shooting at the short focal length to the lens storage state. The first minor 331 being perpendicular to the optical axis direction of the first front lens group 311 makes it possible to secure a storage space for the first front lens group 311.

The mirror drive mechanism 25 rotates the second mirror 332 toward an opposite side of the second lens group 312 (herein, the opposite side of the first front lens group 311 refers to the side of the first minor 331 away from the first front lens group 311) to make the second minor 332 perpendicular to the optical axis direction of the second lens group 312 when the camera module 11 switches from the state of shooting at the long focal length to the lens storage state. The second mirror 332 being perpendicular to the optical axis direction of the second front lens group 312 makes it possible to secure a storage space for the second front lens group 312.

Such a collapsible camera module 11, in which the front lens groups 311, 312 protrude from the housing 4 during the shooting state, has excellent storability and portability when shooting is not performed. Further, by having the rear lens group 32 shared between the optical system of the short focal length side and the optical system of the long focal length side, it is possible to reduce the thickness of the housing 4 and the number of parts while ensuring the flexibility of the focal length. Further, by disposing mirrors 331, 332, that are rotatable about one end 331a, 332a, between the front lens groups 311, 312 and the rear lens group 32, a focal length and an effective diameter of the imaging lens assembly 21 can be increased while allowing the front lens groups 311, 312 to collapse in a restricted installation space.

The camera module 11 to which the present disclosure applies is configured as shown in FIGS. 3, 4, 7, 8, 11, 12, 15, 16, 19 and 20, for example.

The camera module 11 includes an imaging lens assembly 21, an optical filter 22 and an image sensor 23.

As described above, the imaging lens assembly 21 is configured to change the position of the front lens groups 311, 312 in the optical axis direction. The imaging lens assembly 21 is further configured to change whether or not the optical path connecting the first front lens group 311 and the rear lens group 32 is formed between the shooting state at the short focal length and the lens storage state. The imaging lens assembly 21 is further configured to change whether or not the optical path connecting the second front lens group 312 and the rear lens group 32 is formed between the shooting state at the long focal length and the lens storage state. The imaging lens assembly 21 is designed to maintain its good optical performance despite its small size.

The image sensor 23 is, for example, a solid-state image sensor such as a CMOS (Complementary Metal Oxide Semiconductor) or a CCD (Charge Coupled Device). The image sensor 23 has the imaging surface S which is an imaging plane of the imaging lens assembly 21. The image sensor 23 receives incident light from the subject (object side) via the imaging lens assembly 21 and the optical filter 22, photoelectrically converts the light, and outputs an image data, obtained by photoelectric conversion of the light, to a subsequent stage. The optical filter 22 disposed between the imaging lens assembly 21 and the image sensor 23 may be, for example, an IR (infrared) filter which cuts infrared light from incident light.

The imaging lens assembly 21 will be described in more detail. The imaging lens assembly 21 includes an optical system of the short focal length side and an optical system of the long focal length side. The optical system of the short focal length side includes the first front lens group 311 including at least one lens having a positive refractive power, the rear lens group 32 including at least one lens having a negative refractive power, and the first minor 331 positioned between the first front lens group 311 and the rear lens group 32. The optical system of the long focal length side includes the second lens group 312 including at least one lens having a positive refractive power, the rear lens group 32 shared with the optical system of the short focal length side, and the second mirror 332 positioned between the second front lens group 312 and the rear lens group 32. The front lens groups 311, 312 are configured to change their positions in the optical axis directions between the shooting state and the lens storage state, for example, by using the lens driving mechanism 24 mentioned above. The minors 331, 332 are configured to form the optical paths optically connecting the front lens groups 311, 312 and the rear lens group 32 during the switching from the lens storage state to the shooting state, and are configured to secure the storage space for the front lens groups 311, 312 during the switching from the shooting state to the lens storage state, for example, by using the mirror drive mechanism 25 mentioned above. Aperture stops 34 are disposed between most object side disposed lenses of the front lens groups 311, 312 and the mirrors 331, 332.

By employing such a front group collapsible imaging lens assembly 21 which changes whether or not the optical paths are formed by using the mirrors 331, 332, good optical performance can be obtained despite the small size.

The imaging lens assembly 21 can be miniaturized and its good optical performance can be maintained more effectively when the camera module 11 satisfies the following formula (1):

$$(WLG1+TLG1)/(WLG1-TLG1) > -15 \qquad (1)$$

In the formula (1), WLG1 is a focal length of the first front lens group 311 (hereinafter the same applies). TLG1 is a focal length of the second front lens group 312 (hereinafter the same applies).

If the value of (WLG1+TLG1)/(WLG1−TLG1) falls below the lower limit value of the formula (1), the manufacturability of the imaging lens assembly 21 decreases, and it is difficult to maintain its optical performance.

Furthermore, the imaging lens assembly 21 can be miniaturized and its good optical performance can be maintained more effectively when the camera module 11 satisfies the following formula (2) in the shooting state:

$$3 < (\Sigma Wd + \Sigma Td)/(Yh\_w + Yh\_t) < 20 \qquad (2)$$

In the formula (2), $\Sigma Wd$ is a distance on the first optical axis OA1 of the imaging lens assembly 21 from a vertex of an object side surface of a most object side disposed lens of the first front lens group 311 to the imaging surface S (hereinafter the same applies). That is, $\Sigma Wd$ is a full length of the imaging lens assembly 21 of the short focal length side. As described above, the first optical axis OA1 includes the optical axis OA11 of the first front lens group 311 and the optical axis OA3 of the rear lens group 32 that are continuous with each other at the intersection 331*b* with the first mirror 331. In the formula (2), $\Sigma Td$ is a distance on the second optical axis OA2 of the imaging lens assembly 21 from a vertex of an object side surface of a most object side disposed lens of the second front lens group 312 to the imaging surface S (hereinafter the same applies). That is, $\Sigma Td$ is a full length of the imaging lens assembly 21 of the long focal length side. As described above, the second optical axis OA2 includes the optical axis OA21 of the second front lens group 312 and the optical axis of the rear lens group 32 that are continuous with each other at the intersection 332*b* with the second minor 332. Yh_w is an image height, which is a half-diagonal length of the imaging surface S, of the short focal length side (hereinafter the same applies). Yh_t is an image height of the long focal length side (hereinafter the same applies).

If the value of $(\Sigma Wd + \Sigma Td)/(Yh\_w + Yh\_t)$ deviates from the range of formula (2), it is difficult to secure the storage space of the front lens groups 311, 312, miniaturize the imaging lens assembly 21, and maintain its optical performance.

Furthermore, the imaging lens assembly 21 can be miniaturized and its good optical performance can be maintained more effectively when the camera module 11 satisfies the following formula (3) in the shooting state:

$$\Sigma Wd/fw < 2.0 \qquad (3)$$

In the formula (3), fw is a focal length of the imaging lens assembly 21 of the short focal length side (hereinafter the same applies). That is, fw is a focal length of the optical system of the short focal length side.

If the value of $\Sigma Wd/fw$ exceeds the upper limit value of the formula (3), the manufacturability of the imaging lens assembly 21 decreases, and it is difficult to maintain its optical performance.

Furthermore, the imaging lens assembly 21 can be miniaturized and its good optical performance can be maintained more effectively when the camera module 11 satisfies the following formula (4) in the shooting state:

$$\Sigma Td/ft < 2.0 \qquad (4)$$

In the formula (4), ft is a focal length of the imaging lens assembly 21 of the long focal length side (hereinafter the same applies). That is, ft is a focal length of the optical system of the long focal length side.

If the value of ΣTd/ft exceeds the upper limit value of the formula (4), the manufacturability of the imaging lens assembly 21 decreases and it is difficult to maintain its optical performance.

Furthermore, the imaging lens assembly 21 can be miniaturized and its good optical performance can be maintained more effectively when the camera module 11 satisfies the following formula (5):

$$WLG1/fw < 2.0 \qquad (5)$$

If the value of WLG1/fw exceeds the upper limit value of the formula (5), it is difficult to secure a balance of the optical performance between the optical system of the short focal length side and the optical system of the long focal length side, and thus it is difficult to maintain the optical performance.

Furthermore, the imaging lens assembly 21 can be miniaturized and its good optical performance can be maintained more effectively when the camera module 11 satisfies the following formula (6):

$$WLG1/LG2 < 0 \qquad (6)$$

In the formula (6), LG2 is a focal length of the rear lens group 32 (hereinafter the same applies).

If the value of WLG1/LG2 exceeds the upper limit value of the formula (6), it is difficult to secure a balance of the optical performance between the optical system of the short focal length side and the optical system of the long focal length side, and thus it is difficult to maintain the optical performance.

Furthermore, the imaging lens assembly 21 can be miniaturized and its good optical performance can be maintained more effectively when the camera module 11 satisfies the following formula (7):

$$TLG1/LG2 < 0 \qquad (7)$$

If the value of TLG1/LG2 exceeds the upper limit value of the formula (7), it is difficult to secure a balance of the optical performance between the optical system of the short focal length side and the optical system of the long focal length side, and thus it is difficult to maintain the optical performance.

Furthermore, the imaging lens assembly 21 can be miniaturized and its good optical performance can be maintained more effectively when the camera module 11 satisfies the following formula (8) in the shooting state:

$$\Sigma TLd1/\Sigma WLd1 < 2.0 \qquad (8)$$

In the formula (8), ΣTLd1 is a distance on the optical axis OA21 of the second front lens group 312 from a vertex of an object side surface of a most object side disposed lens of the second front lens group 312 to the second mirror 332 (hereinafter the same applies). ΣWLd1 is a distance on the optical axis OA11 of the first front lens group 311 from a vertex of an object side surface of a most object side disposed lens of the first front lens group 311 to the first minor 331 (hereinafter the same applies).

If the value of ΣTLd1/ΣWLd1 exceeds the upper limit value of the formula (8), it is difficult to secure the storage space of the front lens groups 311, 312, miniaturize the imaging lens assembly 21, and maintain its optical performance.

Furthermore, in view of lens forming, it is preferable that an aspheric lens in the imaging lens assembly 21, particularly an aspheric lens of aspheric shape having an inflection point, is formed of a plastic material. Regarding the lenses which constitute the imaging lens assembly 21, lenses having a size equal to or smaller than a specific size are preferably formed of a plastic material, and lenses larger than the specific size are preferably formed of a glass material. This is because it is difficult to form an aspheric lens or a relatively small lens using a material other than a plastic material.

Such a camera module 11 including the imaging lens assembly 21 can be used in compact digital devices (imaging devices) such as mobile phones, wearable cameras and surveillance cameras.

<Configuration Examples of the Camera Module>

Next, more specific examples to which the present disclosure applies will be described. In the following examples, "Si" indicates the ordinal number of the i-th surface which sequentially increases from the object side toward the imaging surface S side. Optical elements of the corresponding surfaces are indicated by the corresponding surface number "Si". Denotations of "first surface" or "1st surface" indicate a surface on the object side of the lens, and denotations of "second surface" or "2nd surface" indicate a surface on the imaging surface S side of the lens. "R" indicates the value of a central curvature radius (mm) of the surface. Regarding "R", "E+i" indicates an exponential expression with a base of 10, i.e., "10i". For example, "1.00 E+18" indicates "1.00×1018". Such an exponential expression also applies to an aspheric coefficient described later. "Di" indicates a value of a distance on the optical axis between the i-th surface and the (i+1)-th surface (mm). "Ndi" indicates a value of a refractive index at d-line (wavelength 587.6 nm) of the material of the optical element having the i-th surface. "vdi" indicates a value of the Abbe number at d-line of the material of the optical element having the i-th surface.

The imaging lens assembly 21 used in the following examples includes lenses having aspheric surfaces. The aspheric shape of the lens is defined by the following formula (9):

$$Z = C \times h2/\{1 + (1 - K \times C2 \times h2)^{1/2}\} + \Sigma An \times h \ n \qquad (9)$$

(n=an integer greater than or equal to 3).

In the formula (9), Z is a depth of the aspheric surface, C is a paraxial curvature which is equal to 1/R, h is a distance from the optical axis to a lens surface, K is a conic constant (second-order aspheric coefficient), and An is an nth-order aspheric coefficient.

First Example

A first example, in which specific numerical values are applied to the camera module 11 shown in FIGS. 3 and 4, will be described.

[Optical System of the Short Focal Length Side]

Figure 3:
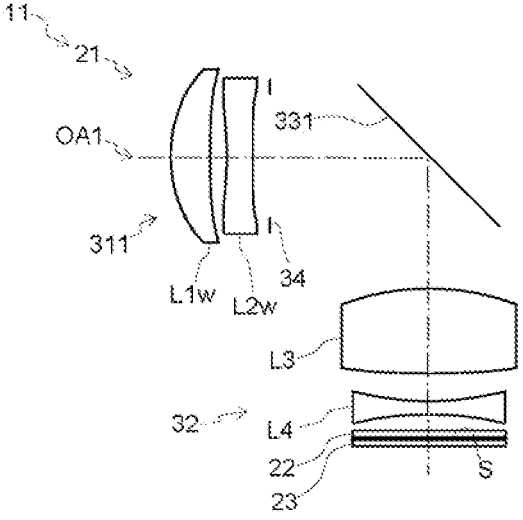
FIG. 3 is a configuration diagram of an optical system of a short focal length side in a camera module according to a first example of the present disclosure.

As shown in FIG. 3, in the first example, the optical system of the short focal length side in the imaging lens assembly 21 (i.e., an optical system for wide-angle shooting) includes, in order from the object side toward the imaging surface S side, a first lens L1w belonging to the first front lens group 311 and having a positive refractive power with a convex surface facing the object side, a second lens L2w belonging to the first front lens group 311 and having a negative refractive power, a first mirror 331, a third lens L3 belonging to the rear lens group 32 and having a positive refractive power with convex surfaces facing the object side and the imaging surface S side, and a fourth lens L4 belonging to the rear lens group 32 and having a negative refractive power with concave surfaces facing the object side and the imaging surface S side. The aperture stop 34 is disposed between the second lens L2*w* and the first mirror 331.

Table 1 shows lens data of the short focal length side of the first example. The unit of length or distance shown in each of the following tables is mm. Table 2 shows a focal length of each lens, a focal length WLG1 of the first front lens group 311, and a focal length LG2 of the rear lens group 32. Table 3 shows the focal length fw of the imaging lens assembly 21 of the short focal length side, the F number Fno, the angle of view 2ω, the full length ΣWd of the imaging lens assembly 21 of the short focal length side which is obtained when an object point is taken at infinity, the distance ΣWLd1 on the optical axis of the first front lens group 311 from a vertex of an object side surface of a most object side disposed lens of the first front lens group 311 to the first mirror 331, the distance ΣWLd2 on the optical axis of the rear lens group 32 from the first mirror 331 to the imaging surface S, and the image height Yh_w of the short focal length side. Table 4 shows the aspheric coefficients of the short focal length side of the imaging lens assembly 21.

TABLE 1

| Si | Ri | Di | Ndi | ν di |
|---|---|---|---|---|
| 1(Virtual Surface) | | | | |
| 2(L1w 1st Surface) | 4.411 | 1.200 | 1.5439 | 56.07 |
| 3(L1w 2nd Surface) | 31.615 | 0.500 | | |

TABLE 1-continued

| Si | Ri | Di | Ndi | ν di |
|---|---|---|---|---|
| 4(L2w 1st Surface) | −8.973 | 0.800 | 1.6349 | 23.97 |
| 5(L2w 2nd Surface) | −46.188 | 0.500 | | |
| 6(Aperture Stop) | | 4.873 | | |
| 7(First Mirror) | | 4.063 | | |
| 8(L3 1st Surface) | 7.497 | 2.600 | 1.5439 | 56.07 |
| 9(L3 2nd Surface) | −27.008 | 0.856 | | |
| 10(L4 1st Surface) | −7.842 | 0.400 | 1.6349 | 23.97 |
| 11(L4 2nd Surface) | 11.888 | 0.500 | | |
| 12(Optical Filter) | | 0.210 | 1.5168 | 64.17 |
| 13(Image Plane) | | 0.072 | | |

TABLE 2

| Lens | Focal Length |
|---|---|
| L1w | 9.29 |
| L2w | −17.69 |
| L3 | 11.10 |
| L4 | −7.38 |
| WLG1 | 17.00 |
| LG2 | −58.32 |

TABLE 3

| | |
|---|---|
| f w | 13.72 |
| Fno | 2.87 |
| 2ω | 19.82 |
| Σ W d | 16.57 |
| Σ WLd1 | 7.87 |
| Σ WLd2 | 8.70 |
| Yh_w | 2.35 |

TABLE 4

| | S2(L1w 1st Surface) | S3(L1w 2nd Surface) | S4(L2w 1st Surface) |
|---|---|---|---|
| R | 4.410914122 | 31.61481134 | −8.972838933 |
| K | 0.000000000000000E+00 | 0.000000000000000E+00 | 0.000000000000000E+00 |
| A3 | 0.000000000000000E+00 | 0.000000000000000E+00 | 0.000000000000000E+00 |
| A4 | 7.796231156462470E−04 | 8.704844694510290E−04 | 7.191326660488500E−03 |
| A5 | 0.000000000000000E+00 | 0.000000000000000E+00 | 0.000000000000000E+00 |
| A6 | 1.381979410611530E−04 | 3.684934907822170E−04 | 2.749895276577850E−04 |
| A7 | 0.000000000000000E+00 | 0.000000000000000E+00 | 0.000000000000000E+00 |
| A8 | 3.246791123735080E−07 | 3.034248740984640E−05 | −1.782204782453850E−05 |
| A9 | 0.000000000000000E+00 | 0.000000000000000E+00 | 0.000000000000000E+00 |
| A10 | 7.471069721557470E−07 | −2.766586419450370E−06 | −2.889078863582960E−06 |
| A11 | 0.000000000000000E+00 | 0.000000000000000E+00 | 0.000000000000000E+00 |
| A12 | 4.241364236970070E−08 | −5.239751961177540E−07 | −2.730922906329450E−07 |
| A13 | 0.000000000000000E+00 | 0.000000000000000E+00 | 0.000000000000000E+00 |
| A14 | 0.000000000000000E+00 | 0.000000000000000E+00 | 0.000000000000000E+00 |
| A15 | 0.000000000000000E+00 | 0.000000000000000E+00 | 0.000000000000000E+00 |
| A16 | 0.000000000000000E+00 | 0.000000000000000E+00 | 0.000000000000000E+00 |
| A17 | 0.000000000000000E+00 | 0.000000000000000E+00 | 0.000000000000000E+00 |
| A18 | 0.000000000000000E+00 | 0.000000000000000E+00 | 0.000000000000000E+00 |
| A19 | 0.000000000000000E+00 | 0.000000000000000E+00 | 0.000000000000000E+00 |
| A20 | 0.000000000000000E+00 | 0.000000000000000E+00 | 0.000000000000000E+00 |

| | S5(L2w 2nd Surface) | S8(L3 1st Surface) | S9(L3 2nd Surface) |
|---|---|---|---|
| R | −46.18757057 | 7.496754471 | −27.00796728 |
| K | 0.000000000000000E+00 | 0.000000000000000E+00 | 0.000000000000000E+00 |
| A3 | 0.000000000000000E+00 | 0.000000000000000E+00 | 0.000000000000000E+00 |
| A4 | 8.487500612743640E−03 | −4.752200000000000E−05 | −2.096440000000000E−04 |
| A5 | 0.000000000000000E+00 | 0.000000000000000E+00 | 0.000000000000000E+00 |
| A6 | 2.466062402637530E−04 | −1.360000000000000E−06 | 8.150000000000000E−06 |
| A7 | 0.000000000000000E+00 | 0.000000000000000E+00 | 0.000000000000000E+00 |
| A8 | −5.876012575697090E−06 | −2.534930000000000E−06 | −1.986210000000000E−05 |
| A9 | 0.000000000000000E+00 | 0.000000000000000E+00 | 0.000000000000000E+00 |
| A10 | −4.387294433630390E−06 | 2.160000000000000E−07 | 2.420000000000000E−07 |
| A11 | 0.000000000000000E+00 | 0.000000000000000E+00 | 0.000000000000000E+00 |

TABLE 4-continued

| A12 | 5.984933706650980E−07 | −1.380000000000000E−08 | 2.620000000000000E−07 |
|-----|----------------------|------------------------|------------------------|
| A13 | 0.000000000000000E+00 | 0.000000000000000E+00 | 0.000000000000000E+00 |
| A14 | 0.000000000000000E+00 | 0.000000000000000E+00 | −2.180000000000000E−08 |
| A15 | 0.000000000000000E+00 | 0.000000000000000E+00 | 0.000000000000000E+00 |
| A16 | 0.000000000000000E+00 | 0.000000000000000E+00 | 0.000000000000000E+00 |
| A17 | 0.000000000000000E+00 | 0.000000000000000E+00 | 0.000000000000000E+00 |
| A18 | 0.000000000000000E+00 | 0.000000000000000E+00 | 0.000000000000000E+00 |
| A19 | 0.000000000000000E+00 | 0.000000000000000E+00 | 0.000000000000000E+00 |
| A20 | 0.000000000000000E+00 | 0.000000000000000E+00 | 0.000000000000000E+00 |

|  |  | S10(L4 1st Surface) | S11(L4 2nd Surface) |
|--|--|---------------------|---------------------|
|  | R | −7.842296776 | 11.88848305 |
|  | K | 0.000000000000000E+00 | 0.000000000000000E+00 |
|  | A3 | 0.000000000000000E+00 | 0.000000000000000E+00 |
|  | A4 | 2.540941000000000E−03 | 2.400000000000000E−03 |
|  | A5 | 0.000000000000000E+00 | 0.000000000000000E+00 |
|  | A6 | −8.910120000000000E−05 | −1.350000000000000E−04 |
|  | A7 | 0.000000000000000E+00 | 0.000000000000000E+00 |
|  | A8 | −6.810000000000000E−06 | 3.570000000000000E−05 |
|  | A9 | 0.000000000000000E+00 | 0.000000000000000E+00 |
|  | A10 | 7.930000000000000E−07 | −1.780000000000000E−05 |
|  | A11 | 0.000000000000000E+00 | 0.000000000000000E+00 |
|  | A12 | 1.310000000000000E−07 | 4.040000000000000E−06 |
|  | A13 | 0.000000000000000E+00 | 0.000000000000000E+00 |
|  | A14 | −1.670000000000000E−08 | −2.820000000000000E−07 |
|  | A15 | 0.000000000000000E+00 | 0.000000000000000E+00 |
|  | A16 | 0.000000000000000E+00 | 0.000000000000000E+00 |
|  | A17 | 0.000000000000000E+00 | 0.000000000000000E+00 |
|  | A18 | 0.000000000000000E+00 | 0.000000000000000E+00 |
|  | A19 | 0.000000000000000E+00 | 0.000000000000000E+00 |
|  | A20 | 0.000000000000000E+00 | 0.000000000000000E+00 |

[Optical System of the Long Focal Length Side]

Figure 4:
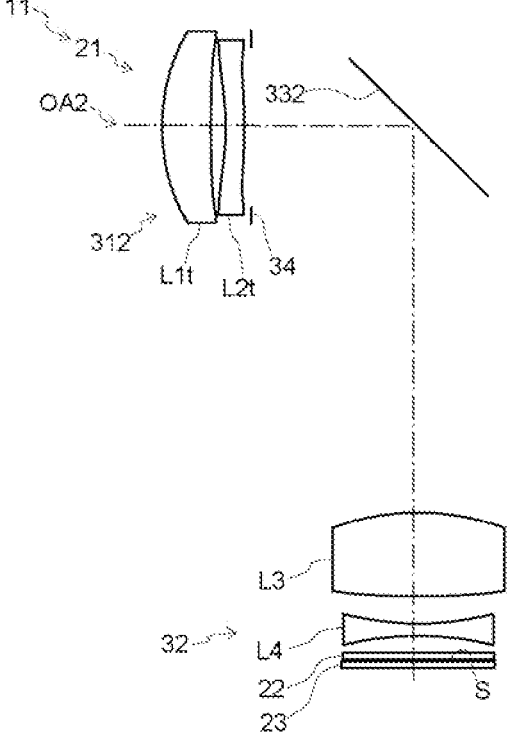
FIG. 4 is a configuration diagram of an optical system of a long focal length side in a camera module according to the first example of the present disclosure.

As shown in FIG. 4, in the first example, the optical system of the long focal length side in the imaging lens assembly 21 (i.e., an optical system for telephoto shooting) includes, in order from the object side toward the imaging surface S side, a first lens L1t belonging to the second front lens group 312 and having a positive refractive power with a convex surface facing the object side, a second lens L2t belonging to the second front lens group 312 and having a negative refractive power, a second mirror 332, a third lens L3 belonging to the rear lens group 32 and having a positive refractive power with convex surfaces facing the object side and the imaging surface S side, and a fourth lens L4 belonging to the rear lens group 32 and having a negative refractive power with concave surfaces facing the object side and the imaging surface S side. The third lens L3 and the fourth lens L4 are the same as those of the optical system of the short focal length side. The aperture stop 34 is disposed between the second lens L2t and the second mirror 332.

Table 5 shows lens data of the long focal length side of the first example. Table 6 shows a focal length of each lens, a focal length TLG1 of the second front lens group 312, and a focal length LG2 of the rear lens group 32. Table 7 shows the focal length ft of the imaging lens assembly 21 of the long focal length side, the F number Fno, the angle of view 2ω, the full length ΣTd of the imaging lens assembly 21 of the long focal length side which is obtained when an object point is taken at infinity, the distance ΣTLd1 on the optical axis of the second front lens group 312 from a vertex of an object side surface of a most object side disposed lens of the second front lens group 312 to the second mirror 332, the distance ΣTLd2 on the optical axis of the rear lens group 32 from the second mirror 332 to the imaging surface S, and the image height Yh_t of the long focal length side. Table 8 shows the aspheric coefficients of the long focal length side of the imaging lens assembly 21.

TABLE 5

| Si | Ri | Di | Ndi | ν di |
|----|-----|-----|------|------|
| 1(Virtual Surface) |  |  |  |  |
| 2(L1t 1st Surface) | 6.675 | 1.500 | 1.5439 | 56.07 |
| 3(L1t 2nd Surface) | 71.081 | 0.450 |  |  |
| 4(L2t 1st Surface) | −7.394 | 0.585 | 1.6349 | 23.97 |
| 5(L2t 2nd Surface) | −13.363 | 0.200 |  |  |
| 6(Aperture Stop) |  | 5.186 |  |  |
| 7(Second Mirror) |  | 12.000 |  |  |
| 8(L3 1st Surface) | 7.497 | 2.600 | 1.5439 | 56.07 |
| 9(L3 2nd Surface) | −27.008 | 0.856 |  |  |
| 10(L4 1st Surface) | −7.842 | 0.400 | 1.6349 | 23.97 |
| 11(L4 2nd Surface) | 11.888 | 0.500 |  |  |
| 12(Optical Filter) |  | 0.210 | 1.5168 | 64.17 |
| 13(Image Plane) |  | 0.072 |  |  |

TABLE 6

| Lens | Focal Length |
|------|--------------|
| L1t | 13.45 |
| L2t | −27.11 |
| L3 | 11.10 |
| L4 | −7.38 |
| TLG1 | 24.79 |
| LG2 | −58.32 |

TABLE 7

| f t | 20.00 |
|-----|-------|
| Fno | 3.54 |
| 2ω | 13.60 |
| Σ T d | 24.56 |
| Σ TLd1 | 7.92 |
| Σ TLd2 | 16.64 |
| Yh_t | 2.35 |

TABLE 8

| | S2(L1t 1st Surface) | S3(L1t 2nd Surface) | S4(L2t 1st Surface) |
|---|---|---|---|
| R | 6.675056323857960E+00 | 7.108135137411820E+01 | −7.394332814723790E+00 |
| K | 0.000000000000000E+00 | 0.000000000000000E+00 | 0.000000000000000E+00 |
| A3 | 0.000000000000000E+00 | 0.000000000000000E+00 | 0.000000000000000E+00 |
| A4 | 7.929278088657610E−04 | 1.122636771260660E−03 | 6.198320082211080E−03 |
| A5 | 0.000000000000000E+00 | 0.000000000000000E+00 | 0.000000000000000E+00 |
| A6 | 2.664534834586900E−05 | 1.444774817764340E−04 | 5.838132907893380E−05 |
| A7 | 0.000000000000000E+00 | 0.000000000000000E+00 | 0.000000000000000E+00 |
| A8 | −2.166895300232820E−06 | −2.180492886780910E−06 | −2.271605306141170E−05 |
| A9 | 0.000000000000000E+00 | 0.000000000000000E+00 | 0.000000000000000E+00 |
| A10 | 9.250748697287540E−08 | −2.244672493609720E−06 | −5.214257306155690E−07 |
| A11 | 0.000000000000000E+00 | 0.000000000000000E+00 | 0.000000000000000E+00 |
| A12 | 1.652192079990260E−08 | 1.606025675436760E−07 | 1.085198773099280E−07 |
| A13 | 0.000000000000000E+00 | 0.000000000000000E+00 | 0.000000000000000E+00 |
| A14 | 0.000000000000000E+00 | 0.000000000000000E+00 | 0.000000000000000E+00 |
| A15 | 0.000000000000000E+00 | 0.000000000000000E+00 | 0.000000000000000E+00 |
| A16 | 0.000000000000000E+00 | 0.000000000000000E+00 | 0.000000000000000E+00 |
| A17 | 0.000000000000000E+00 | 0.000000000000000E+00 | 0.000000000000000E+00 |
| A18 | 0.000000000000000E+00 | 0.000000000000000E+00 | 0.000000000000000E+00 |
| A19 | 0.000000000000000E+00 | 0.000000000000000E+00 | 0.000000000000000E+00 |
| A20 | 0.000000000000000E+00 | 0.000000000000000E+00 | 0.000000000000000E+00 |

| | S5(L2t 2nd Surface) | S8(L3 1st Surface) | S9(L3 2nd Surface) |
|---|---|---|---|
| R | −1.336262990573610E+01 | 7.496754471 | −27.00796728 |
| K | 0.000000000000000E+00 | 0.000000000000000E+00 | 0.000000000000000E+00 |
| A3 | 0.000000000000000E+00 | 0.000000000000000E+00 | 0.000000000000000E+00 |
| A4 | 5.775393985002090E−03 | −4.752200000000000E−05 | −2.096440000000000E−04 |
| A5 | 0.000000000000000E+00 | 0.000000000000000E+00 | 0.000000000000000E+00 |
| A6 | −1.896942862473370E−06 | −1.360000000000000E−06 | 8.150000000000000E−06 |
| A7 | 0.000000000000000E+00 | 0.000000000000000E+00 | 0.000000000000000E+00 |
| A8 | −1.181242003677500E−05 | −2.534930000000000E−06 | −1.986210000000000E−05 |
| A9 | 0.000000000000000E+00 | 0.000000000000000E+00 | 0.000000000000000E+00 |
| A10 | −5.087032644077150E−07 | 2.160000000000000E−07 | 2.420000000000000E−07 |
| A11 | 0.000000000000000E+00 | 0.000000000000000E+00 | 0.000000000000000E+00 |
| A12 | 9.922050030316430E−08 | −1.380000000000000E−08 | 2.620000000000000E−07 |
| A13 | 0.000000000000000E+00 | 0.000000000000000E+00 | 0.000000000000000E+00 |
| A14 | 0.000000000000000E+00 | 0.000000000000000E+00 | −2.180000000000000E−08 |
| A15 | 0.000000000000000E+00 | 0.000000000000000E+00 | 0.000000000000000E+00 |
| A16 | 0.000000000000000E+00 | 0.000000000000000E+00 | 0.000000000000000E+00 |
| A17 | 0.000000000000000E+00 | 0.000000000000000E+00 | 0.000000000000000E+00 |
| A18 | 0.000000000000000E+00 | 0.000000000000000E+00 | 0.000000000000000E+00 |
| A19 | 0.000000000000000E+00 | 0.000000000000000E+00 | 0.000000000000000E+00 |
| A20 | 0.000000000000000E+00 | 0.000000000000000E+00 | 0.000000000000000E+00 |

| | S10(L4 1st Surface) | S11(L4 2nd Surface) |
|---|---|---|
| R | −7.842296776 | 11.88848305 |
| K | 0.000000000000000E+00 | 0.000000000000000E+00 |
| A3 | 0.000000000000000E+00 | 0.000000000000000E+00 |
| A4 | 2.540941000000000E−03 | 2.400000000000000E−03 |
| A5 | 0.000000000000000E+00 | 0.000000000000000E+00 |
| A6 | −8.910120000000000E−05 | −1.350000000000000E−04 |
| A7 | 0.000000000000000E+00 | 0.000000000000000E+00 |
| A8 | −6.810000000000000E−06 | 3.570000000000000E−05 |
| A9 | 0.000000000000000E+00 | 0.000000000000000E+00 |
| A10 | 7.930000000000000E−07 | −1.780000000000000E−05 |
| A11 | 0.000000000000000E+00 | 0.000000000000000E+00 |
| A12 | 1.310000000000000E−07 | 4.040000000000000E−06 |
| A13 | 0.000000000000000E+00 | 0.000000000000000E+00 |
| A14 | −1.670000000000000E−08 | −2.820000000000000E−07 |
| A15 | 0.000000000000000E+00 | 0.000000000000000E+00 |
| A16 | 0.000000000000000E+00 | 0.000000000000000E+00 |
| A17 | 0.000000000000000E+00 | 0.000000000000000E+00 |
| A18 | 0.000000000000000E+00 | 0.000000000000000E+00 |
| A19 | 0.000000000000000E+00 | 0.000000000000000E+00 |
| A20 | 0.000000000000000E+00 | 0.000000000000000E+00 |

Table 9 shows values corresponding to the conditional expressions.

TABLE 9

| | |
|---|---|
| (WLG1 + TLG1)/(WLG1 − TLG1) > −15 | −5.37 |
| 3 < (Σ W d + Σ Td)/(Y h_w + Yh_t) < 20 | 8.75 |
| Σ W d/f w < 2.0 | 1.21 |

TABLE 9-continued

| | |
|---|---|
| Σ T d/f t < 2.0 | 1.23 |
| WLG1/fw < 2.0 | 1.24 |
| WLG1/LG2 < 0 | −0.29 |
| TLG1/LG2 < 0 | −0.43 |
| Σ TLd1/Σ WLd1 < 2.0 | 1.01 |

Figure 5:
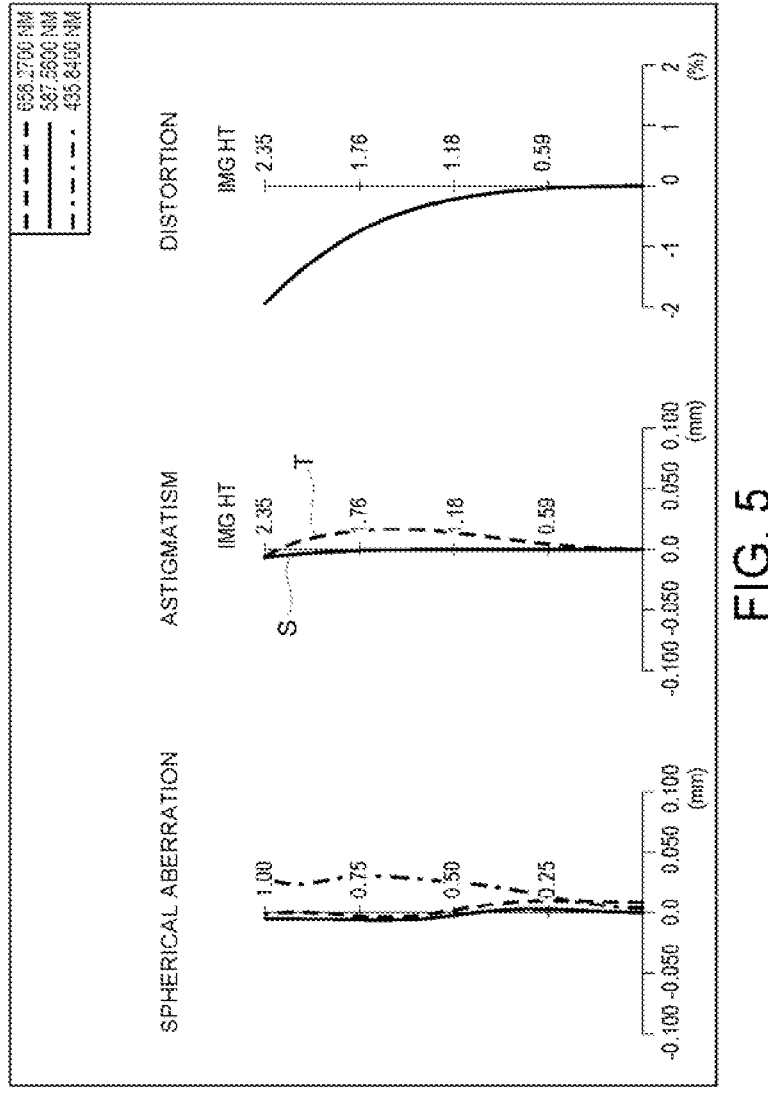
FIG. 5 is an aberration diagram of the optical system of the short focal length side in the camera module according to the first example of the present disclosure.

Aberrations of the short focal length side in the first example are shown in FIG. 5. FIG. 5 shows, as examples of aberrations, spherical aberration, astigmatism (field curvature) and distortion. Each of these aberration diagrams shows aberrations with d-line (587.56 nm) as a reference wavelength. In the spherical aberration diagram, aberrations with respect to g-line (435.84 nm) and C-line (656.27 nm) are also shown. In the graph showing astigmatism, "S" indicates a value of aberration on a sagittal image surface and "T" indicates a value of aberration on a tangential image surface. "IMG HT" indicates an image height. The same applies to aberration diagrams in other examples.

Figure 6:
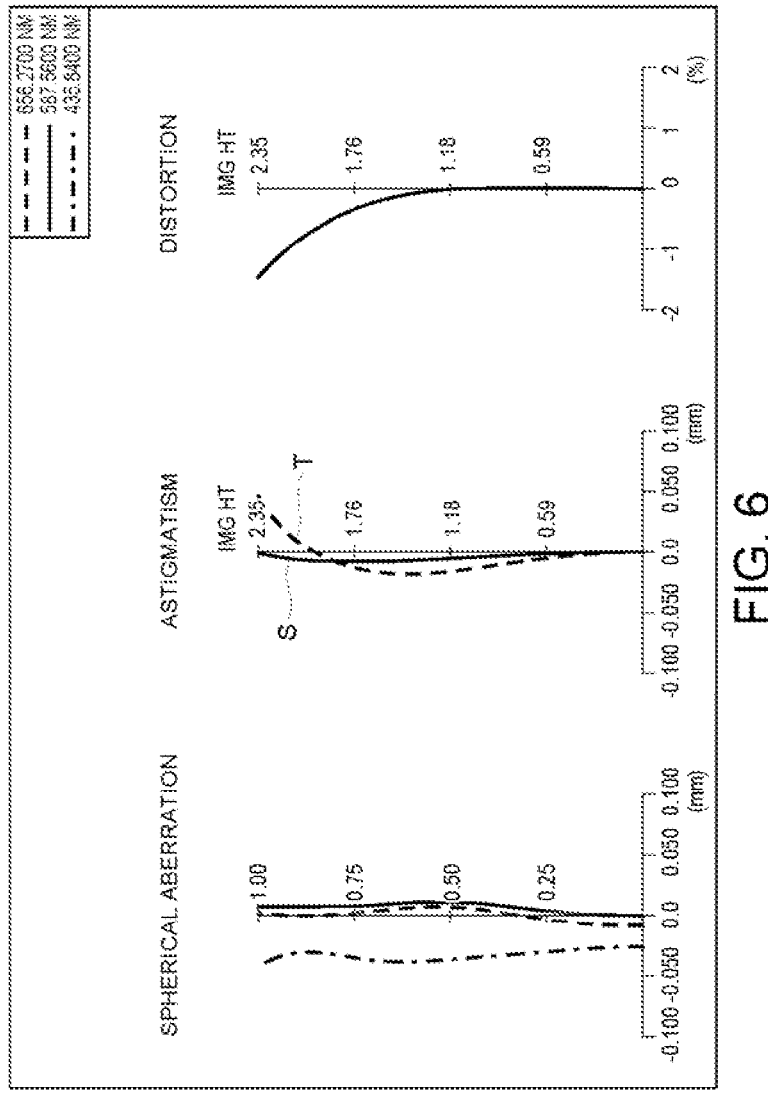
FIG. 6 is an aberration diagram of the optical system of the long focal length side in the camera module according to the first example of the present disclosure.

Aberrations of the long focal length side in the first example are shown in FIG. 6.

As can be seen from the aberration diagrams in FIGS. 5 and 6, it is clear that the camera module 11 in the first example can satisfactorily correct various aberrations to obtain superior optical performance despite being small in size.

Second Example

Figure 7:
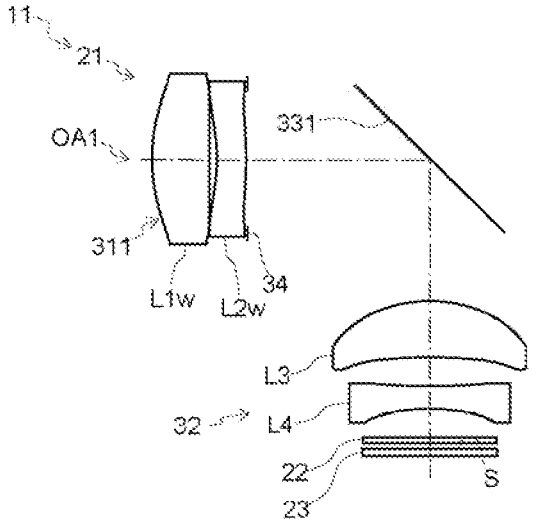
FIG. 7 is a configuration diagram of an optical system of a short focal length side in a camera module according to a second example of the present disclosure.

Next, a second example, in which specific numerical values are applied to the camera module 11 shown in FIGS. 7 and 8, will be described.
[Optical System of the Short Focal Length Side]
The optical system of the short focal length side in the imaging lens assembly 21 according to the second example is shown in FIG. 7. Lens parameters like those in the first example are shown in Tables 10-13.

TABLE 10

| Si | Ri | Di | Ndi | ν di |
|---|---|---|---|---|
| 1(Virtual Surface) | | | | |
| 2(L1w 1st Surface) | 6.526 | 2.000 | 1.5439 | 56.07 |

TABLE 10-continued

| Si | Ri | Di | Ndi | ν di |
|---|---|---|---|---|
| 3(L1w 2nd Surface) | −80.921 | 0.250 | | |
| 4(L2w 1st Surface) | −6.314 | 1.000 | 1.6349 | 23.97 |
| 5(L2w 2nd Surface) | −11.773 | 0.050 | | |
| 6(Aperture Stop) | | 6.330 | | |
| 7(First Mirror) | | 5.000 | | |
| 8(L3 1st Surface) | 4.742 | 2.000 | 1.5439 | 56.07 |
| 9(L3 2nd Surface) | 21.321 | 1.000 | | |
| 10(L4 1st Surface) | −18.592 | 0.800 | 1.6349 | 23.97 |
| 11(L4 2nd Surface) | 6.647 | 1.000 | | |
| 12(Optical Filter) | | 0.210 | 1.5168 | 64.17 |
| 13(Image Plane) | | 0.202 | | |

TABLE 11

| Lens | Focal Length |
|---|---|
| L1w | 11.21 |
| L2w | −23.09 |
| L3 | 10.77 |
| L4 | −7.62 |
| WLG1 | 20.57 |
| LG2 | −415.50 |

TABLE 12

| | |
|---|---|
| f w | 15.00 |
| Fno | 2.74 |
| 2ω | 18.17 |
| Σ W d | 19.84 |
| Σ WLd1 | 9.63 |
| Σ WLd2 | 10.21 |
| Yh_w | 2.35 |

TABLE 13

| | S2(L1w 1st Surface) | S3(L1w 2nd Surface) | S4(L2w 1st Surface) |
|---|---|---|---|
| R | 6.525501994 | −80.92140306 | −6.313563832 |
| K | 0.000000000000000E+00 | 0.000000000000000E+00 | 0.000000000000000E+00 |
| A3 | 0.000000000000000E+00 | 0.000000000000000E+00 | 0.000000000000000E+00 |
| A4 | −1.561464468877150E−04 | 2.040821419317100E−04 | 6.657400225517260E−03 |
| A5 | 0.000000000000000E+00 | 0.000000000000000E+00 | 0.000000000000000E+00 |
| A6 | −3.018956836603460E−05 | 9.700757022170380E−05 | 7.649873566571300E−05 |
| A7 | 0.000000000000000E+00 | 0.000000000000000E+00 | 0.000000000000000E+00 |
| A8 | −1.095405828718410E−05 | −1.304425147783240E−05 | −1.690959940451090E−05 |
| A9 | 0.000000000000000E+00 | 0.000000000000000E+00 | 0.000000000000000E+00 |
| A10 | 4.681938038039550E−08 | −3.384274500203850E−06 | 6.662424918148170E−07 |
| A11 | 0.000000000000000E+00 | 0.000000000000000E+00 | 0.000000000000000E+00 |
| A12 | −2.493034438615690E−08 | 2.106144375501220E−07 | −4.330239717425400E−08 |
| A13 | 0.000000000000000E+00 | 0.000000000000000E+00 | 0.000000000000000E+00 |
| A14 | 0.000000000000000E+00 | 0.000000000000000E+00 | 0.000000000000000E+00 |
| A15 | 0.000000000000000E+00 | 0.000000000000000E+00 | 0.000000000000000E+00 |
| A16 | 0.000000000000000E+00 | 0.000000000000000E+00 | 0.000000000000000E+00 |
| A17 | 0.000000000000000E+00 | 0.000000000000000E+00 | 0.000000000000000E+00 |
| A18 | 0.000000000000000E+00 | 0.000000000000000E+00 | 0.000000000000000E+00 |
| A19 | 0.000000000000000E+00 | 0.000000000000000E+00 | 0.000000000000000E+00 |
| A20 | 0.000000000000000E+00 | 0.000000000000000E+00 | 0.000000000000000E+00 |

| | S5(L2w 2nd Surface) | S8(L3 1st Surface) | S9(L3 2nd Surface) |
|---|---|---|---|
| R | −11.77258409 | 4.742398784 | 21.32122592 |
| K | 0.000000000000000E+00 | 0.000000000000000E+00 | 0.000000000000000E+00 |
| A3 | 0.000000000000000E+00 | 0.000000000000000E+00 | 0.000000000000000E+00 |
| A4 | 5.583345894658100E−03 | 5.360000000000000E−04 | 9.420000000000000E−04 |
| A5 | 0.000000000000000E+00 | 0.000000000000000E+00 | 0.000000000000000E+00 |
| A6 | 3.725556295277710E−05 | 5.490000000000000E−06 | −3.200000000000000E−05 |
| A7 | 0.000000000000000E+00 | 0.000000000000000E+00 | 0.000000000000000E+00 |
| A8 | −1.328194560413400E−05 | 8.570000000000000E−06 | 3.700000000000000E−05 |

TABLE 13-continued

| A9 | 0.000000000000000E+00 | 0.000000000000000E+00 | 0.000000000000000E+00 |
|---|---|---|---|
| A10 | 3.135115862990780E−06 | −1.770000000000000E−07 | 9.530000000000000E−08 |
| A11 | 0.000000000000000E+00 | 0.000000000000000E+00 | 0.000000000000000E+00 |
| A12 | −1.699916004239420E−07 | 2.480000000000000E−08 | 1.590000000000000E−07 |
| A13 | 0.000000000000000E+00 | 0.000000000000000E+00 | 0.000000000000000E+00 |
| A14 | 0.000000000000000E+00 | 0.000000000000000E+00 | −4.070000000000000E−08 |
| A15 | 0.000000000000000E+00 | 0.000000000000000E+00 | 0.000000000000000E+00 |
| A16 | 0.000000000000000E+00 | 0.000000000000000E+00 | 0.000000000000000E+00 |
| A17 | 0.000000000000000E+00 | 0.000000000000000E+00 | 0.000000000000000E+00 |
| A18 | 0.000000000000000E+00 | 0.000000000000000E+00 | 0.000000000000000E+00 |
| A19 | 0.000000000000000E+00 | 0.000000000000000E+00 | 0.000000000000000E+00 |
| A20 | 0.000000000000000E+00 | 0.000000000000000E+00 | 0.000000000000000E+00 |

| | S10(L4 1st Surface) | S11(L4 2nd Surface) |
|---|---|---|
| R | −18.59161801 | 6.646730899 |
| K | 0.000000000000000E+00 | 0.000000000000000E+00 |
| A3 | 0.000000000000000E+00 | 0.000000000000000E+00 |
| A4 | −1.330000000000000E−03 | −1.570000000000000E−03 |
| A5 | 0.000000000000000E+00 | 0.000000000000000E+00 |
| A6 | 4.300000000000000E−04 | 2.800000000000000E−04 |
| A7 | 0.000000000000000E+00 | 0.000000000000000E+00 |
| A8 | 4.970000000000000E−05 | 2.560000000000000E−04 |
| A9 | 0.000000000000000E+00 | 0.000000000000000E+00 |
| A10 | −4.070000000000000E−07 | −5.330000000000000E−05 |
| A11 | 0.000000000000000E+00 | 0.000000000000000E+00 |
| A12 | −1.130000000000000E−06 | 8.140000000000000E−06 |
| A13 | 0.000000000000000E+00 | 0.000000000000000E+00 |
| A14 | 3.490000000000000E−08 | −4.510000000000000E−07 |
| A15 | 0.000000000000000E+00 | 0.000000000000000E+00 |
| A16 | 0.000000000000000E+00 | 0.000000000000000E+00 |
| A17 | 0.000000000000000E+00 | 0.000000000000000E+00 |
| A18 | 0.000000000000000E+00 | 0.000000000000000E+00 |
| A19 | 0.000000000000000E+00 | 0.000000000000000E+00 |
| A20 | 0.000000000000000E+00 | 0.000000000000000E+00 |

[Optical System of the Long Focal Length Side]

Figure 8:
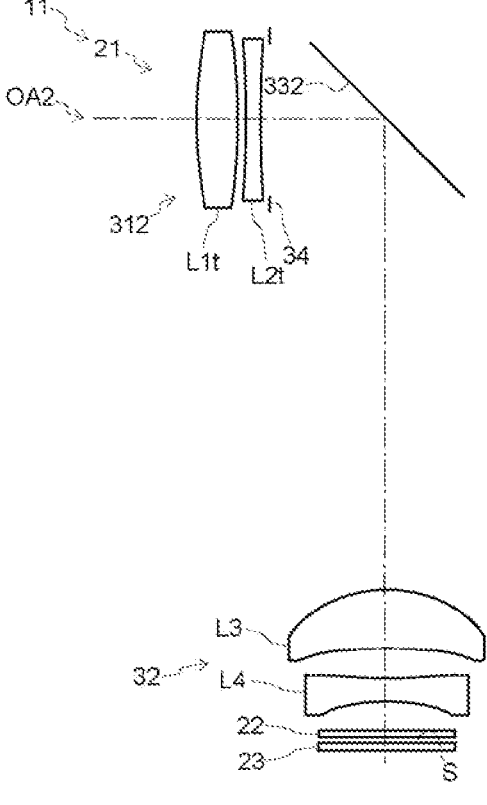
FIG. 8 is a configuration diagram of an optical system of a long focal length side in a camera module according to the second example of the present disclosure.

The optical system of the long focal length side in the imaging lens assembly 21 according to the second example is shown in FIG. 8. Lens parameters like those in the first example are shown in Tables 14-17.

TABLE 14

| Si | Ri | Di | Ndi | ν di |
|---|---|---|---|---|
| 1(Virtual Surface) | | | | |
| 2(L1t 1st Surface) | 13.789 | 1.426 | 1.5439 | 56.07 |
| 3(L1t 2nd Surface) | −22.564 | 0.300 | | |
| 4(L2t 1st Surface) | −35.328 | 0.500 | 1.6349 | 23.97 |
| 5(L2t 2nd Surface) | 54.398 | 0.300 | | |
| 6(Aperture Stop) | | 4.000 | | |
| 7(Second Mirror) | | 16.000 | | |
| 8(L3 1st Surface) | 4.742 | 2.000 | 1.5439 | 56.07 |
| 9(L3 2nd Surface) | 21.321 | 1.000 | | |
| 10(L4 1st Surface) | −18.592 | 0.800 | 1.6349 | 23.97 |
| 11(L4 2nd Surface) | 6.647 | 1.000 | | |
| 12(Optical Filter) | | 0.210 | 1.5168 | 64.17 |
| 13(Image Plane) | | 0.202 | | |

TABLE 15

| Lens | Focal Length |
|---|---|
| L1t | 15.98 |
| L2t | −33.66 |
| L3 | 10.77 |
| L4 | −7.62 |
| TLG1 | 28.78 |
| LG2 | −415.50 |

TABLE 16

| | |
|---|---|
| f t | 20.99 |
| Fno | 3.74 |
| 2ω | 12.96 |
| Σ T d | 27.74 |
| Σ TLd1 | 6.53 |
| Σ TLd2 | 21.21 |
| Yh_t | 2.35 |

TABLE 17

| | S2(L1t 1st Surface) | S3(L1t 2nd Surface) | S4(L2t 1st Surface) |
|---|---|---|---|
| R | 13.78947865 | −22.56364628 | −35.32805437 |
| K | 0.000000000000000E+00 | 0.000000000000000E+00 | 0.000000000000000E+00 |
| A3 | 0.000000000000000E+00 | 0.000000000000000E+00 | 0.000000000000000E+00 |
| A4 | −1.770216546845490E−04 | −7.243875223022810E−05 | 9.709837631508290E−05 |
| A5 | 0.000000000000000E+00 | 0.000000000000000E+00 | 0.000000000000000E+00 |
| A6 | −5.893832975371500E−06 | −1.238829401246780E−05 | 6.255288992169690E−06 |
| A7 | 0.000000000000000E+00 | 0.000000000000000E+00 | 0.000000000000000E+00 |
| A8 | −1.592790122410170E−06 | −1.087260118457520E−06 | 2.695069622415690E−07 |
| A9 | 0.000000000000000E+00 | 0.000000000000000E+00 | 0.000000000000000E+00 |
| A10 | 2.961415090395080E−08 | −4.806269817934110E−08 | −9.484946232006380E−08 |

TABLE 17-continued

| | | | |
|---|---|---|---|
| A11 | 0.000000000000000E+00 | 0.000000000000000E+00 | 0.000000000000000E+00 |
| A12 | −2.415883935876260E−09 | 4.478407946654580E−09 | 7.515027588982370E−09 |
| A13 | 0.000000000000000E+00 | 0.000000000000000E+00 | 0.000000000000000E+00 |
| A14 | 0.000000000000000E+00 | 0.000000000000000E+00 | 0.000000000000000E+00 |
| A15 | 0.000000000000000E+00 | 0.000000000000000E+00 | 0.000000000000000E+00 |
| A16 | 0.000000000000000E+00 | 0.000000000000000E+00 | 0.000000000000000E+00 |
| A17 | 0.000000000000000E+00 | 0.000000000000000E+00 | 0.000000000000000E+00 |
| A18 | 0.000000000000000E+00 | 0.000000000000000E+00 | 0.000000000000000E+00 |
| A19 | 0.000000000000000E+00 | 0.000000000000000E+00 | 0.000000000000000E+00 |
| A20 | 0.000000000000000E+00 | 0.000000000000000E+00 | 0.000000000000000E+00 |

| | S5(L2t 2nd Surface) | S8(L3 1st Surface) | S9(L3 2nd Surface) |
|---|---|---|---|
| R | 54.3978855 | 4.742398784 | 21.32122592 |
| K | 0.000000000000000E+00 | 0.000000000000000E+00 | 0.000000000000000E+00 |
| A3 | 0.000000000000000E+00 | 0.000000000000000E+00 | 0.000000000000000E+00 |
| A4 | 3.105966990197370E−05 | 5.360000000000000E−04 | 9.420000000000000E−04 |
| A5 | 0.000000000000000E+00 | 0.000000000000000E+00 | 0.000000000000000E+00 |
| A6 | 1.715708886147400E−05 | 5.490000000000000E−06 | −3.200000000000000E−05 |
| A7 | 0.000000000000000E+00 | 0.000000000000000E+00 | 0.000000000000000E+00 |
| A8 | −1.385610092204180E−06 | 8.570000000000000E−06 | 3.700000000000000E−05 |
| A9 | 0.000000000000000E+00 | 0.000000000000000E+00 | 0.000000000000000E+00 |
| A10 | 1.223322579789730E−07 | −1.770000000000000E−07 | 9.530000000000000E−08 |
| A11 | 0.000000000000000E+00 | 0.000000000000000E+00 | 0.000000000000000E+00 |
| A12 | −5.369058994683230E−09 | 2.480000000000000E−08 | 1.590000000000000E−07 |
| A13 | 0.000000000000000E+00 | 0.000000000000000E+00 | 0.000000000000000E+00 |
| A14 | 0.000000000000000E+00 | 0.000000000000000E+00 | −4.070000000000000E−08 |
| A15 | 0.000000000000000E+00 | 0.000000000000000E+00 | 0.000000000000000E+00 |
| A16 | 0.000000000000000E+00 | 0.000000000000000E+00 | 0.000000000000000E+00 |
| A17 | 0.000000000000000E+00 | 0.000000000000000E+00 | 0.000000000000000E+00 |
| A18 | 0.000000000000000E+00 | 0.000000000000000E+00 | 0.000000000000000E+00 |
| A19 | 0.000000000000000E+00 | 0.000000000000000E+00 | 0.000000000000000E+00 |
| A20 | 0.000000000000000E+00 | 0.000000000000000E+00 | 0.000000000000000E+00 |

| | S10(L4 1st Surface) | S11(L4 2nd Surface) |
|---|---|---|
| R | −18.59161801 | 6.646730899 |
| K | 0.000000000000000E+00 | 0.000000000000000E+00 |
| A3 | 0.000000000000000E+00 | 0.000000000000000E+00 |
| A4 | −1.330000000000000E−03 | −1.570000000000000E−03 |
| A5 | 0.000000000000000E+00 | 0.000000000000000E+00 |
| A6 | 4.300000000000000E−04 | 2.800000000000000E−04 |
| A7 | 0.000000000000000E+00 | 0.000000000000000E+00 |
| A8 | 4.970000000000000E−05 | 2.560000000000000E−04 |
| A9 | 0.000000000000000E+00 | 0.000000000000000E+00 |
| A10 | −4.070000000000000E−07 | −5.330000000000000E−05 |
| A11 | 0.000000000000000E+00 | 0.000000000000000E+00 |
| A12 | −1.130000000000000E−06 | 8.140000000000000E−06 |
| A13 | 0.000000000000000E+00 | 0.000000000000000E+00 |
| A14 | 3.490000000000000E−08 | −4.510000000000000E−07 |
| A15 | 0.000000000000000E+00 | 0.000000000000000E+00 |
| A16 | 0.000000000000000E+00 | 0.000000000000000E+00 |
| A17 | 0.000000000000000E+00 | 0.000000000000000E+00 |
| A18 | 0.000000000000000E+00 | 0.000000000000000E+00 |
| A19 | 0.000000000000000E+00 | 0.000000000000000E+00 |
| A20 | 0.000000000000000E+00 | 0.000000000000000E+00 |

Table 18 shows values corresponding to the conditional expressions.

TABLE 18

| | |
|---|---|
| (WLG1 + TLG1)/(WLG1 − TLG1) > −15 | −6.01 |
| 3 < (Σ W d + Σ Td)/(Y h_w + Yh_t) < 20 | 10.12 |
| Σ W d/f w < 2.0 | 1.32 |
| Σ T d/f t < 2.0 | 1.32 |
| WLG1/fw < 2.0 | 1.37 |
| WLG1/LG2 < 0 | −0.05 |
| TLG1/LG2 < 0 | −0.07 |
| Σ TLd1/Σ WLd1 < 2.0 | 0.68 |

Figure 9:
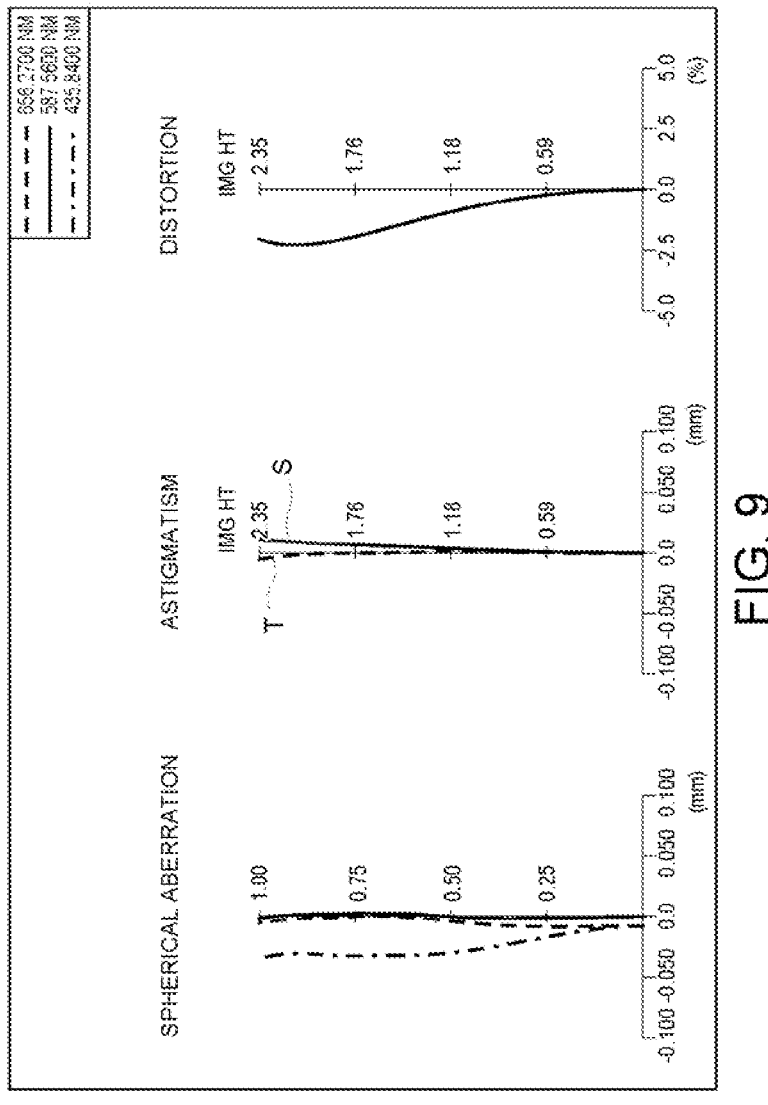
FIG. 9 is an aberration diagram of the optical system of the short focal length side in the camera module according to the second example of the present disclosure.
Figure 10:
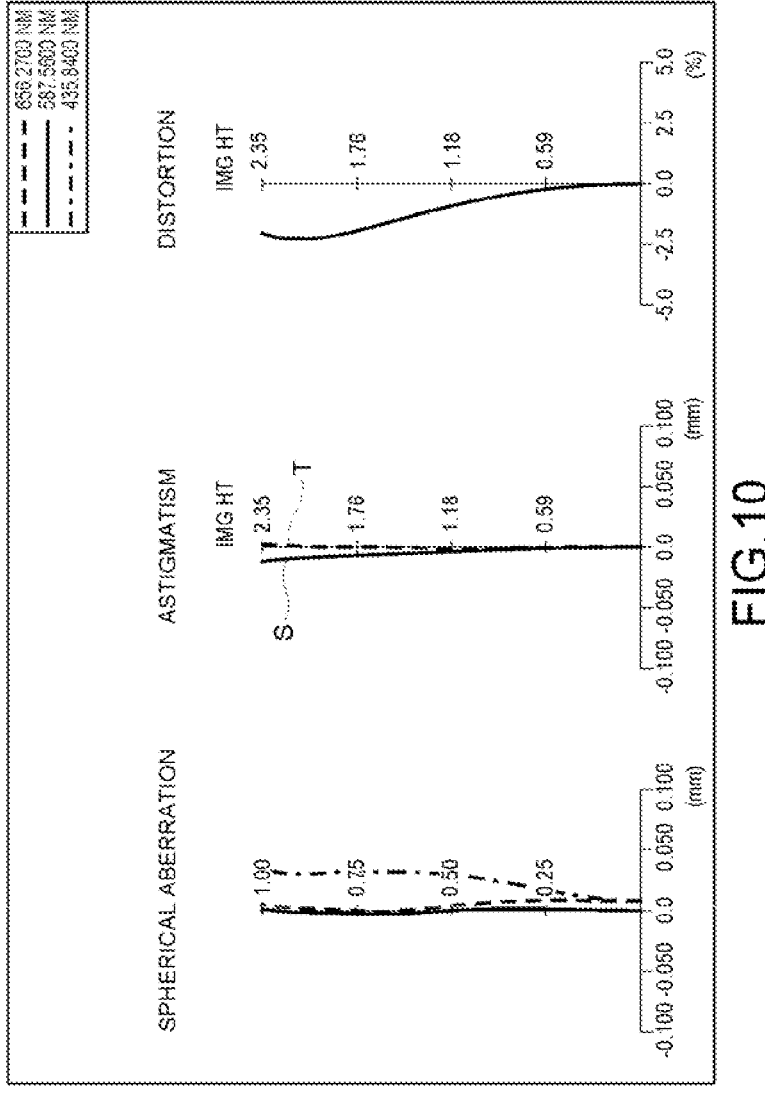
FIG. 10 is an aberration diagram of the optical system of the long focal length side in the camera module according to the second example of the present disclosure.

Aberrations of the short focal length side in the second example are shown in FIG. 9. Aberrations of the long focal length side in the second example are shown in FIG. 10.

According to the second example, by making the lens parameters different from those of the first example, the degree of freedom in designing the camera module 11 according to the present disclosure can be increased while obtaining the same effect as the first example.

Third Example

Next, a third example, in which specific numerical values are applied to the camera module 11 shown in FIGS. 11 and 12, will be described.

[Optical System of the Short Focal Length Side]

Figure 11:
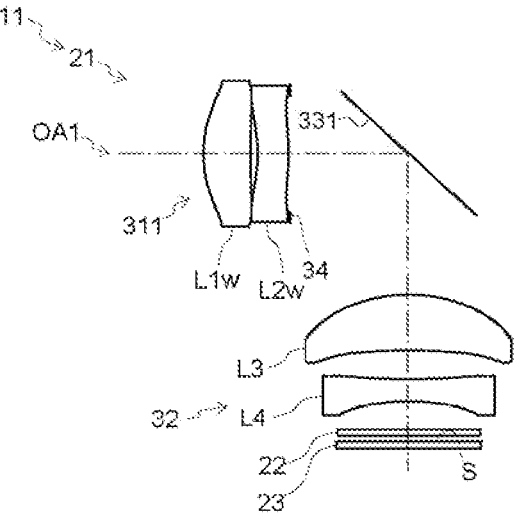
FIG. 11 is a configuration diagram of an optical system of a short focal length side in a camera module according to a third example of the present disclosure.

The optical system of the short focal length side in the imaging lens assembly 21 according to the third example is shown in FIG. 11. Lens parameters like those in the first example are shown in Tables 19-22.

TABLE 19

| Si | Ri | Di | Ndi | ν di |
|---|---|---|---|---|
| 1(Virtual Surface) | | | | |
| 2(L1w 1st Surface) | 4.805 | 1.520 | 1.5439 | 56.07 |
| 3(L1w 2nd Surface) | 50.121 | 0.250 | | |
| 4(L2w 1st Surface) | −5.287 | 1.000 | 1.6349 | 23.97 |
| 5(L2w 2nd Surface) | −9.734 | 0.050 | | |
| 6(Aperture Stop) | | 3.843 | | |
| 7(First Mirror) | | 5.000 | | |
| 8(L3 1st Surface) | 4.740 | 2.000 | 1.5439 | 56.07 |
| 9(L3 2nd Surface) | 21.321 | 1.000 | | |
| 10(L4 1st Surface) | −18.592 | 0.800 | 1.6349 | 23.97 |
| 11(L4 2nd Surface) | 6.647 | 1.000 | | |
| 12(Optical Filter) | | 0.210 | 1.5168 | 64.17 |
| 13(Image Plane) | | 0.201 | | |

TABLE 20

| Lens | Focal Length |
|---|---|
| L1w | 9.67 |
| L2w | −19.97 |
| L3 | 10.76 |
| L4 | −7.62 |
| WLG1 | 17.83 |
| LG2 | −429.86 |

TABLE 21

| | |
|---|---|
| f w | 13.00 |
| Fno | 2.77 |
| 2ω | 20.95 |
| Σ W d | 16.87 |
| Σ WLd1 | 6.66 |
| Σ WLd2 | 10.21 |
| Yh_w | 2.35 |

TABLE 22

| | S2(L1w 1st Surface) | S3(L1w 2nd Surface) | S4(L2w 1st Surface) |
|---|---|---|---|
| R | 4.805277999 | 50.12133065 | −5.287404732 |
| K | 0.000000000000000E+00 | 0.000000000000000E+00 | 0.000000000000000E+00 |
| A3 | 0.000000000000000E+00 | 0.000000000000000E+00 | 0.000000000000000E+00 |
| A4 | 8.233889780134970E−05 | 1.620002089503830E−03 | 1.177562293298670E−02 |
| A5 | 0.000000000000000E+00 | 0.000000000000000E+00 | 0.000000000000000E+00 |
| A6 | −9.578382722485000E−05 | 1.063737648006800E−04 | 4.545716358594500E−05 |
| A7 | 0.000000000000000E+00 | 0.000000000000000E+00 | 0.000000000000000E+00 |
| A8 | −3.841355232928060E−05 | −9.072015118356620E−05 | −2.158423024365230E−05 |
| A9 | 0.000000000000000E+00 | 0.000000000000000E+00 | 0.000000000000000E+00 |
| A10 | −3.332691838084570E−06 | −1.362832402038300E−05 | 1.413387451927070E−06 |
| A11 | 0.000000000000000E+00 | 0.000000000000000E+00 | 0.000000000000000E+00 |
| A12 | −1.529467292862350E−07 | 1.481685820032430E−06 | −3.077374716596410E−07 |
| A13 | 0.000000000000000E+00 | 0.000000000000000E+00 | 0.000000000000000E+00 |
| A14 | 0.000000000000000E+00 | 0.000000000000000E+00 | 0.000000000000000E+00 |
| A15 | 0.000000000000000E+00 | 0.000000000000000E+00 | 0.000000000000000E+00 |
| A16 | 0.000000000000000E+00 | 0.000000000000000E+00 | 0.000000000000000E+00 |
| A17 | 0.000000000000000E+00 | 0.000000000000000E+00 | 0.000000000000000E+00 |
| A18 | 0.000000000000000E+00 | 0.000000000000000E+00 | 0.000000000000000E+00 |
| A19 | 0.000000000000000E+00 | 0.000000000000000E+00 | 0.000000000000000E+00 |
| A20 | 0.000000000000000E+00 | 0.000000000000000E+00 | 0.000000000000000E+00 |

| | S5(L2w 2nd Surface) | S8(L3 1st Surface) | S9(L3 2nd Surface) |
|---|---|---|---|
| R | −9.734149764 | 4.74 | 21.32122592 |
| K | 0.000000000000000E+00 | 0.000000000000000E+00 | 0.000000000000000E+00 |
| A3 | 0.000000000000000E+00 | 0.000000000000000E+00 | 0.000000000000000E+00 |
| A4 | 9.341283661863760E−03 | 5.360000000000000E−04 | 9.422170000000000E−04 |
| A5 | 0.000000000000000E+00 | 0.000000000000000E+00 | 0.000000000000000E+00 |
| A6 | 1.082085123163560E−04 | 5.490000000000000E−06 | −3.198100000000000E−05 |
| A7 | 0.000000000000000E+00 | 0.000000000000000E+00 | 0.000000000000000E+00 |
| A8 | −3.161408320405850E−06 | 8.570000000000000E−06 | 3.700310000000000E−05 |
| A9 | 0.000000000000000E+00 | 0.000000000000000E+00 | 0.000000000000000E+00 |
| A10 | 1.281224134964940E−05 | −1.770000000000000E−07 | 9.530000000000000E−08 |
| A11 | 0.000000000000000E+00 | 0.000000000000000E+00 | 0.000000000000000E+00 |
| A12 | −1.019849993197830E−06 | 2.480000000000000E−08 | 1.590000000000000E−07 |
| A13 | 0.000000000000000E+00 | 0.000000000000000E+00 | 0.000000000000000E+00 |
| A14 | 0.000000000000000E+00 | 0.000000000000000E+00 | −4.070000000000000E−08 |
| A15 | 0.000000000000000E+00 | 0.000000000000000E+00 | 0.000000000000000E+00 |
| A16 | 0.000000000000000E+00 | 0.000000000000000E+00 | 0.000000000000000E+00 |
| A17 | 0.000000000000000E+00 | 0.000000000000000E+00 | 0.000000000000000E+00 |
| A18 | 0.000000000000000E+00 | 0.000000000000000E+00 | 0.000000000000000E+00 |
| A19 | 0.000000000000000E+00 | 0.000000000000000E+00 | 0.000000000000000E+00 |
| A20 | 0.000000000000000E+00 | 0.000000000000000E+00 | 0.000000000000000E+00 |

| | S10(L4 1st Surface) | S11(L4 2nd Surface) |
|---|---|---|
| R | −18.59161801 | 6.646730899 |
| K | 0.000000000000000E+00 | 0.000000000000000E+00 |
| A3 | 0.000000000000000E+00 | 0.000000000000000E+00 |
| A4 | −1.327509000000000E−03 | −1.567845000000000E−03 |
| A5 | 0.000000000000000E+00 | 0.000000000000000E+00 |
| A6 | 4.295020000000000E−04 | 2.798640000000000E−04 |

TABLE 22-continued

| | | |
|---|---|---|
| A7 | 0.000000000000000E+00 | 0.000000000000000E+00 |
| A8 | 4.973280000000000E−05 | 2.556520000000000E−04 |
| A9 | 0.000000000000000E+00 | 0.000000000000000E+00 |
| A10 | −4.070000000000000E−07 | −5.328010000000000E−05 |
| A11 | 0.000000000000000E+00 | 0.000000000000000E+00 |
| A12 | −1.130000000000000E−06 | 8.141540000000000E−06 |
| A13 | 0.000000000000000E+00 | 0.000000000000000E+00 |
| A14 | 3.490000000000000E−08 | −4.510000000000000E−07 |
| A15 | 0.000000000000000E+00 | 0.000000000000000E+00 |
| A16 | 0.000000000000000E+00 | 0.000000000000000E+00 |
| A17 | 0.000000000000000E+00 | 0.000000000000000E+00 |
| A18 | 0.000000000000000E+00 | 0.000000000000000E+00 |
| A19 | 0.000000000000000E+00 | 0.000000000000000E+00 |
| A20 | 0.000000000000000E+00 | 0.000000000000000E+00 |

[Optical System of the Long Focal Length Side]

Figure 12:
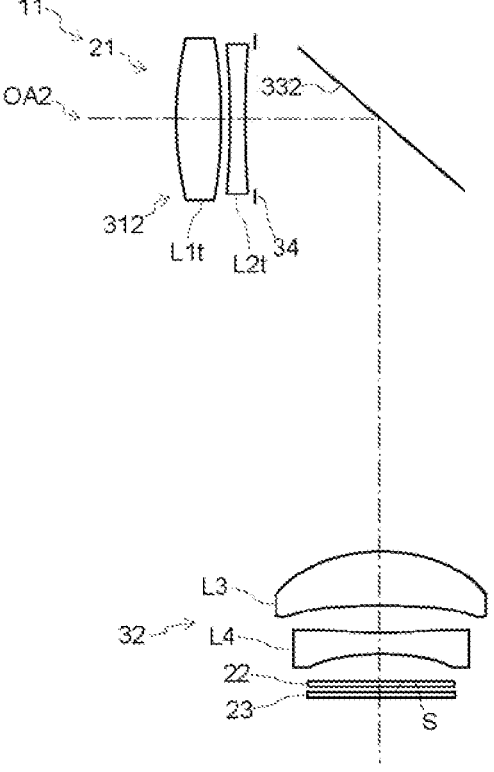
FIG. 12 is a configuration diagram of an optical system of a long focal length side in a camera module according to the third example of the present disclosure.

The optical system of the long focal length side in the imaging lens assembly 21 according to the third example is shown in FIG. 12. Lens parameters like those in the first example are shown in Tables 23-26.

TABLE 23

| Si | Ri | Di | Ndi | ν di |
|---|---|---|---|---|
| 1(Virtual Surface) | | | | |
| 2(L1t 1st Surface) | 13.789 | 1.426 | 1.5439 | 56.07 |
| 3(L1t 2nd Surface) | −22.564 | 0.300 | | |
| 4(L2t 1st Surface) | −35.328 | 0.500 | 1.6349 | 23.97 |
| 5(L2t 2nd Surface) | 54.398 | 0.300 | | |
| 6(Aperture Stop) | | 4.000 | | |
| 7(Second Mirror) | | 16.000 | | |
| 8(L3 1st Surface) | 4.740 | 2.000 | 1.5439 | 56.07 |
| 9(L3 2nd Surface) | 21.321 | 1.000 | | |
| 10(L4 1st Surface) | −18.592 | 0.800 | 1.6349 | 23.97 |
| 11(L4 2nd Surface) | 6.647 | 1.000 | | |
| 12(Optical Filter) | | 0.210 | 1.5168 | 64.17 |
| 13(Image Plane) | | 0.201 | | |

TABLE 24

| Lens | Focal Length |
|---|---|
| L1t | 15.98 |
| L2t | −33.66 |
| L3 | 10.76 |
| L4 | −7.62 |
| TLG1 | 28.78 |
| LG2 | −429.86 |

TABLE 25

| | |
|---|---|
| f t | 20.98 |
| Fno | 3.74 |
| 2ω | 12.97 |
| Σ T d | 27.74 |
| Σ TLd1 | 6.53 |
| Σ TLd2 | 21.21 |
| Yh_t | 2.35 |

TABLE 26

| | S2(L1t 1st Surface) | S3(L1t 2nd Surface) | S4(L2t 1st Surface) |
|---|---|---|---|
| R | 13.78947865 | −22.56364628 | −35.32805437 |
| K | 0.000000000000000E+00 | 0.000000000000000E+00 | 0.000000000000000E+00 |
| A3 | 0.000000000000000E+00 | 0.000000000000000E+00 | 0.000000000000000E+00 |
| A4 | −1.770216546845490E−04 | −7.243875223022810E−05 | 9.709837631508290E−05 |
| A5 | 0.000000000000000E+00 | 0.000000000000000E+00 | 0.000000000000000E+00 |
| A6 | −5.893832975371500E−06 | −1.238829401246780E−05 | 6.255288992169690E−06 |
| A7 | 0.000000000000000E+00 | 0.000000000000000E+00 | 0.000000000000000E+00 |
| A8 | −1.592790122410170E−06 | −1.087260118457520E−06 | 2.695069622415690E−07 |
| A9 | 0.000000000000000E+00 | 0.000000000000000E+00 | 0.000000000000000E+00 |
| A10 | 2.961415090395080E−08 | −4.806269817934110E−08 | −9.484946232006380E−08 |
| A11 | 0.000000000000000E+00 | 0.000000000000000E+00 | 0.000000000000000E+00 |
| A12 | −2.415883935876260E−09 | 4.478407946654580E−09 | 7.515027588982370E−09 |
| A13 | 0.000000000000000E+00 | 0.000000000000000E+00 | 0.000000000000000E+00 |
| A14 | 0.000000000000000E+00 | 0.000000000000000E+00 | 0.000000000000000E+00 |
| A15 | 0.000000000000000E+00 | 0.000000000000000E+00 | 0.000000000000000E+00 |
| A16 | 0.000000000000000E+00 | 0.000000000000000E+00 | 0.000000000000000E+00 |
| A17 | 0.000000000000000E+00 | 0.000000000000000E+00 | 0.000000000000000E+00 |
| A18 | 0.000000000000000E+00 | 0.000000000000000E+00 | 0.000000000000000E+00 |
| A19 | 0.000000000000000E+00 | 0.000000000000000E+00 | 0.000000000000000E+00 |
| A20 | 0.000000000000000E+00 | 0.000000000000000E+00 | 0.000000000000000E+00 |

| | S5(L2t 2nd Surface) | S8(L3 1st Surface) | S9(L3 2nd Surface) |
|---|---|---|---|
| R | 54.3978855 | 4.74 | 21.32122592 |
| K | 0.000000000000000E+00 | 0.000000000000000E+00 | 0.000000000000000E+00 |
| A3 | 0.000000000000000E+00 | 0.000000000000000E+00 | 0.000000000000000E+00 |
| A4 | 3.105966990197370E−05 | 5.360000000000000E−04 | 9.422170000000000E−04 |
| A5 | 0.000000000000000E+00 | 0.000000000000000E+00 | 0.000000000000000E+00 |
| A6 | 1.715708886147400E−05 | 5.490000000000000E−06 | −3.198100000000000E−05 |
| A7 | 0.000000000000000E+00 | 0.000000000000000E+00 | 0.000000000000000E+00 |
| A8 | −1.385610092204180E−06 | 8.570000000000000E−06 | 3.700310000000000E−05 |

TABLE 26-continued

| | | | |
|---|---|---|---|
| A9 | 0.000000000000000E+00 | 0.000000000000000E+00 | 0.000000000000000E+00 |
| A10 | 1.223322579789730E−07 | −1.770000000000000E−07 | 9.530000000000000E−08 |
| A11 | 0.000000000000000E+00 | 0.000000000000000E+00 | 0.000000000000000E+00 |
| A12 | −5.369058994683230E−09 | 2.480000000000000E−08 | 1.590000000000000E−07 |
| A13 | 0.000000000000000E+00 | 0.000000000000000E+00 | 0.000000000000000E+00 |
| A14 | 0.000000000000000E+00 | 0.000000000000000E+00 | −4.070000000000000E−08 |
| A15 | 0.000000000000000E+00 | 0.000000000000000E+00 | 0.000000000000000E+00 |
| A16 | 0.000000000000000E+00 | 0.000000000000000E+00 | 0.000000000000000E+00 |
| A17 | 0.000000000000000E+00 | 0.000000000000000E+00 | 0.000000000000000E+00 |
| A18 | 0.000000000000000E+00 | 0.000000000000000E+00 | 0.000000000000000E+00 |
| A19 | 0.000000000000000E+00 | 0.000000000000000E+00 | 0.000000000000000E+00 |
| A20 | 0.000000000000000E+00 | 0.000000000000000E+00 | 0.000000000000000E+00 |

| | S10(L4 1st Surface) | S11(L4 2nd Surface) |
|---|---|---|
| R | −18.59161801 | 6.646730899 |
| K | 0.000000000000000E+00 | 0.000000000000000E+00 |
| A3 | 0.000000000000000E+00 | 0.000000000000000E+00 |
| A4 | −1.327509000000000E−03 | −1.567845000000000E−03 |
| A5 | 0.000000000000000E+00 | 0.000000000000000E+00 |
| A6 | 4.295020000000000E−04 | 2.798640000000000E−04 |
| A7 | 0.000000000000000E+00 | 0.000000000000000E+00 |
| A8 | 4.973280000000000E−05 | 2.556520000000000E−04 |
| A9 | 0.000000000000000E+00 | 0.000000000000000E+00 |
| A10 | −4.070000000000000E−07 | −5.328010000000000E−05 |
| A11 | 0.000000000000000E+00 | 0.000000000000000E+00 |
| A12 | −1.130000000000000E−06 | 8.141540000000000E−06 |
| A13 | 0.000000000000000E+00 | 0.000000000000000E+00 |
| A14 | 3.490000000000000E−08 | −4.510000000000000E−07 |
| A15 | 0.000000000000000E+00 | 0.000000000000000E+00 |
| A16 | 0.000000000000000E+00 | 0.000000000000000E+00 |
| A17 | 0.000000000000000E+00 | 0.000000000000000E+00 |
| A18 | 0.000000000000000E+00 | 0.000000000000000E+00 |
| A19 | 0.000000000000000E+00 | 0.000000000000000E+00 |
| A20 | 0.000000000000000E+00 | 0.000000000000000E+00 |

Table 27 shows values corresponding to the conditional expressions.

TABLE 27

| | |
|---|---|
| (WLG1 + TLG1)/(WLG1 − TLG1) > −15 | −4.26 |
| 3 < (Σ W d + Σ Td)/(Y h_w + Yh_t) < 20 | 9.49 |
| Σ W d/f w < 2.0 | 1.30 |
| Σ T d/f t < 2.0 | 1.32 |
| WLG1/fw < 2.0 | 1.37 |
| WLG1/LG2 < 0 | −0.04 |
| TLG1/LG2 < 0 | −0.07 |
| Σ TLd1/Σ WLd1 < 2.0 | 0.98 |

Figure 13:
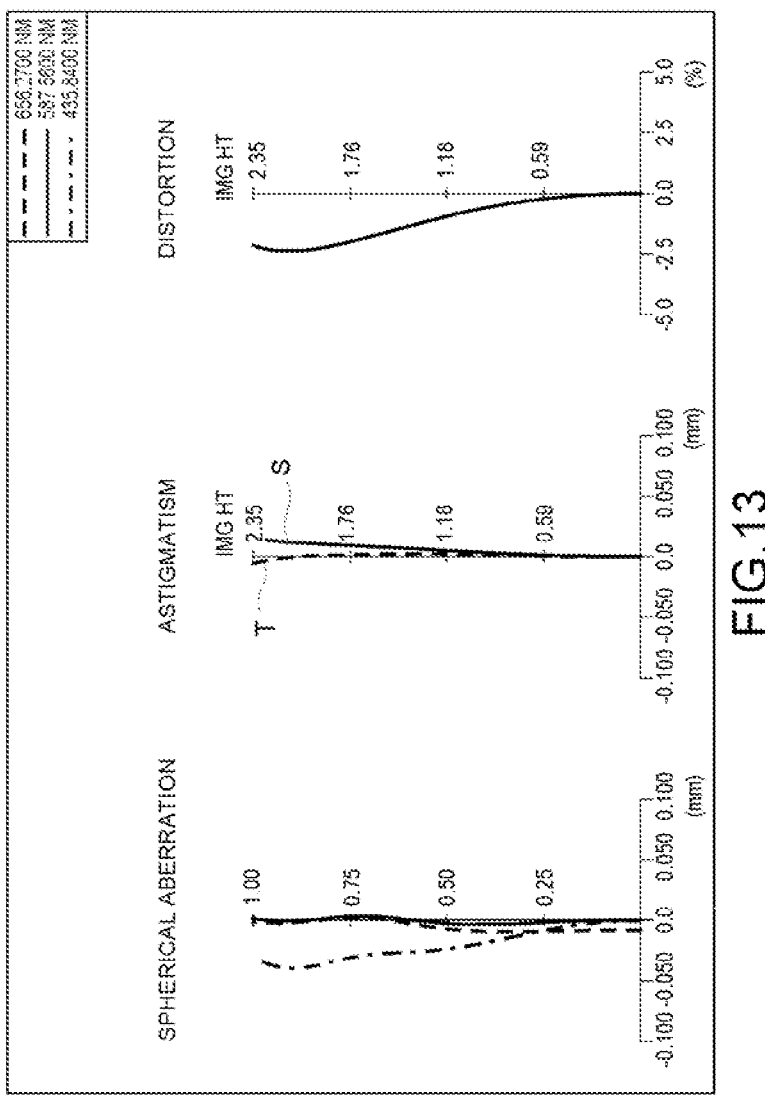
FIG. 13 is an aberration diagram of the optical system of the short focal length side in the camera module according to the third example of the present disclosure.
Figure 14:
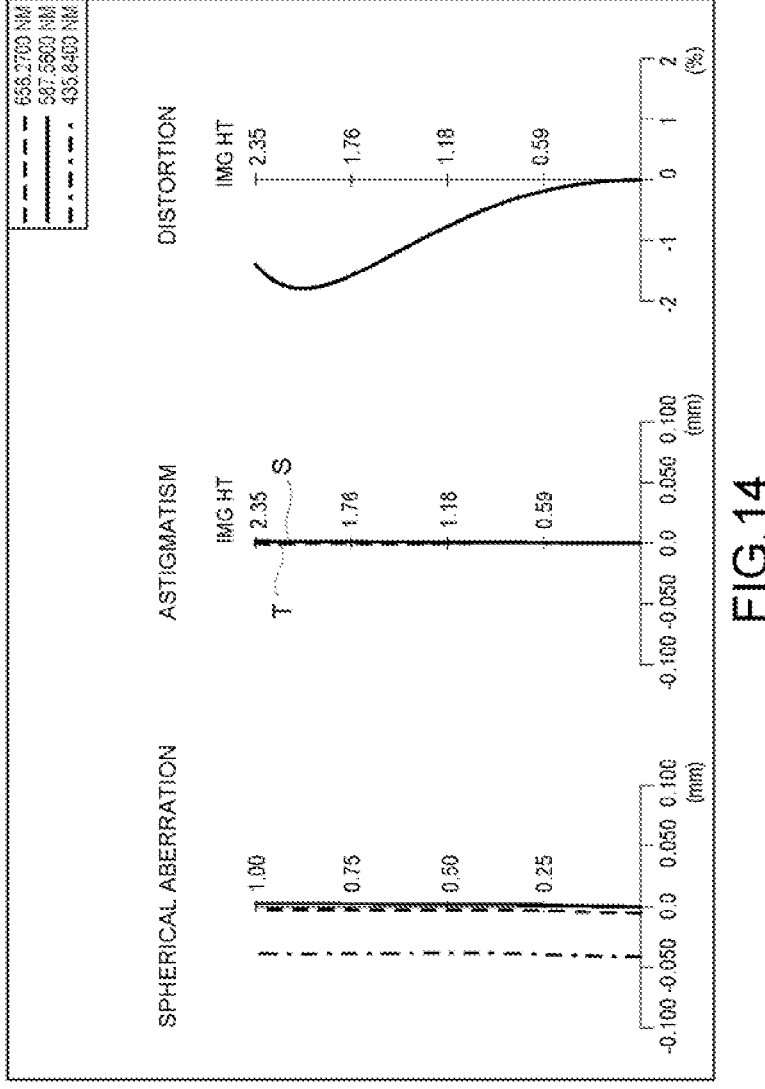
FIG. 14 is an aberration diagram of the optical system of the long focal length side in the camera module according to the third example of the present disclosure.

Aberrations of the short focal length side in the third example are shown in FIG. 13. Aberrations of the long focal length side in the third example are shown in FIG. 14.

According to the third example, by making the lens parameters different from those of the first and second examples, the degree of freedom in designing the camera module 11 according to the present disclosure can be further increased while obtaining the same effects as the first example.

Fourth Example

Next, a fourth example, in which specific numerical values are applied to the camera module 11 shown in FIGS. 15 and 16, will be described.

[Optical System of the Short Focal Length Side]

Figure 15:
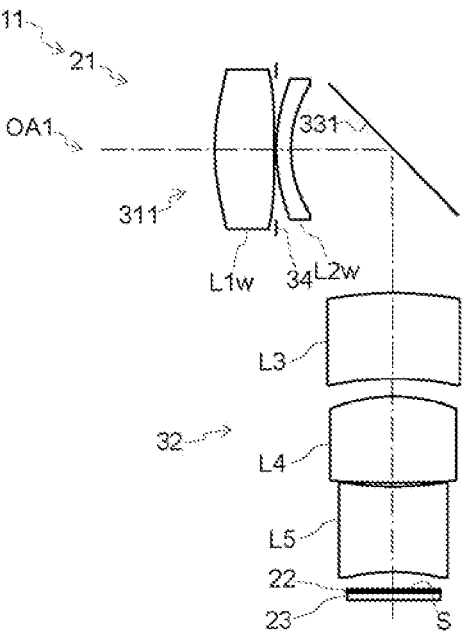
FIG. 15 is a configuration diagram of an optical system of a short focal length side in a camera module according to a fourth example of the present disclosure.

The optical system of the short focal length side in the imaging lens assembly 21 according to the fourth example is shown in FIG. 15. In the fourth example, the rear lens group 32 further includes a fifth lens L5 other than the third lens L3 and the fourth lens L4. Lens parameters like those in the first example are shown in Tables 28-31.

TABLE 28

| Si | Ri | Di | Ndi | ν di |
|---|---|---|---|---|
| 1(Virtual Surface) | | | | |
| 2(L1w 1st Surface) | 10.304 | 3.000 | 1.5439 | 56.07 |
| 3(L1w 2nd Surface) | −92.717 | 0.100 | | |
| 4(Aperture Stop) | | 0.000 | | |
| 5(L2w 1st Surface) | 9.174 | 0.750 | 1.6349 | 23.97 |
| 6(L2w 2nd Surface) | 5.948 | 5.111 | | |
| 7(First Mirror) | | 7.000 | | |
| 8(L3 1st Surface) | −18.649 | 4.200 | 1.544 | 56.07 |
| 9(L3 2nd Surface) | −16.960 | 0.859 | | |
| 10(L4 1st Surface) | −8.702 | 4.200 | 1.544 | 56.07 |
| 11(L4 2nd Surface) | 43.701 | 0.179 | | |
| 12(L5 1st Surface) | 14.661 | 4.200 | 1.635 | 23.97 |
| 13(L5 2nd Surface) | −11.794 | 0.800 | | |
| 14(Optical Filter) | | 0.110 | 1.517 | 64.17 |
| 15(Image Plane) | | 0.103 | | |

TABLE 29

| Lens | Focal Length |
|---|---|
| L1w | 17.25 |
| L2w | −29.29 |
| L3 | −3000.00 |
| L4 | 13.75 |
| L5 | −9.70 |
| WLG1 | 32.93 |
| LG2 | −536.77 |

TABLE 30

| | |
|---|---|
| f w | 22.00 |
| Fno | 2.95 |
| 2ω | 12.51 |

TABLE 30-continued

| Σ W d | 30.61 |
|---|---|
| Σ WLd1 | 8.96 |

TABLE 30-continued

| Σ WLd2 | 21.65 |
|---|---|
| Yh_w | 2.35 |

TABLE 31

|  | S2(L1w 1st Surface) | S3(L1w 2nd Surface) | S5(L2w 1st Surface) | S6(L2w 2nd Surface) |
|---|---|---|---|---|
| R | 10.30445527 | −92.7170546 | 9.174038472 | 5.948390296 |
| K | 0.000000000000000E+00 | 0.000000000000000E+00 | 0.000000000000000E+00 | 0.000000000000000E+00 |
| A3 | 0.000000000000000E+00 | 0.000000000000000E+00 | 0.000000000000000E+00 | 0.000000000000000E+00 |
| A4 | −5.057913309650780E−04 | −7.240070196290200E−04 | 4.206359458642550E−04 | 5.475870513376300E−04 |
| A5 | 0.000000000000000E+00 | 0.000000000000000E+00 | 0.000000000000000E+00 | 0.000000000000000E+00 |
| A6 | −1.415637028573420E−05 | −1.401983775832960E−05 | −1.218541695382870E−05 | −9.241244966330210E−06 |
| A7 | 0.000000000000000E+00 | 0.000000000000000E+00 | 0.000000000000000E+00 | 0.000000000000000E+00 |
| A8 | −2.412299250427020E−07 | −1.026573251404670E−07 | −1.003485426178820E−06 | −1.576443250703110E−06 |
| A9 | 0.000000000000000E+00 | 0.000000000000000E+00 | 0.000000000000000E+00 | 0.000000000000000E+00 |
| A10 | −3.734737288464740E−09 | −3.945674340127270E−09 | −1.519727482240250E−08 | −6.719723274861280E−08 |
| A11 | 0.000000000000000E+00 | 0.000000000000000E+00 | 0.000000000000000E+00 | 0.000000000000000E+00 |
| A12 | −3.176436211961120E−10 | 2.387694213136970E−10 | 2.010490784097740E−09 | 3.958402933864590E−09 |
| A13 | 0.000000000000000E+00 | 0.000000000000000E+00 | 0.000000000000000E+00 | 0.000000000000000E+00 |
| A14 | 0.000000000000000E+00 | 0.000000000000000E+00 | 0.000000000000000E+00 | 0.000000000000000E+00 |
| A15 | 0.000000000000000E+00 | 0.000000000000000E+00 | 0.000000000000000E+00 | 0.000000000000000E+00 |
| A16 | 0.000000000000000E+00 | 0.000000000000000E+00 | 0.000000000000000E+00 | 0.000000000000000E+00 |
| A17 | 0.000000000000000E+00 | 0.000000000000000E+00 | 0.000000000000000E+00 | 0.000000000000000E+00 |
| A18 | 0.000000000000000E+00 | 0.000000000000000E+00 | 0.000000000000000E+00 | 0.000000000000000E+00 |
| A19 | 0.000000000000000E+00 | 0.000000000000000E+00 | 0.000000000000000E+00 | 0.000000000000000E+00 |
| A20 | 0.000000000000000E+00 | 0.000000000000000E+00 | 0.000000000000000E+00 | 0.000000000000000E+00 |

|  | S8(L3 1st Surface) | S9(L3 2nd Surface) | S10(L4 1st Surface) | S11(L4 2nd Surface) |
|---|---|---|---|---|
| R | 18.64896654 | 16.95974663 | 8.702493241 | −43.70077847 |
| K | 0.000000000000000E+00 | 0.000000000000000E+00 | 0.000000000000000E+00 | 0.000000000000000E+00 |
| A3 | 0.000000000000000E+00 | 0.000000000000000E+00 | 0.000000000000000E+00 | 0.000000000000000E+00 |
| A4 | −6.178710000000000E−05 | 1.039380000000000E−04 | 8.702620000000000E−05 | 5.255620000000000E−04 |
| A5 | 0.000000000000000E+00 | 0.000000000000000E+00 | 0.000000000000000E+00 | 0.000000000000000E+00 |
| A6 | −1.710000000000000E−06 | 5.420000000000000E−06 | 4.310000000000000E−06 | −8.246360000000000E−05 |
| A7 | 0.000000000000000E+00 | 0.000000000000000E+00 | 0.000000000000000E+00 | 0.000000000000000E+00 |
| A8 | 2.710000000000000E−07 | 2.760000000000000E−07 | −2.070000000000000E−07 | −4.150000000000000E−06 |
| A9 | 0.000000000000000E+00 | 0.000000000000000E+00 | 0.000000000000000E+00 | 0.000000000000000E+00 |
| A10 | −1.360000000000000E−08 | 3.730000000000000E−08 | 3.070000000000000E−08 | 5.550000000000000E−07 |
| A11 | 0.000000000000000E+00 | 0.000000000000000E+00 | 0.000000000000000E+00 | 0.000000000000000E+00 |
| A12 | 0.000000000000000E+00 | 0.000000000000000E+00 | 4.590000000000000E−09 | 2.920000000000000E−07 |
| A13 | 0.000000000000000E+00 | 0.000000000000000E+00 | 0.000000000000000E+00 | 0.000000000000000E+00 |
| A14 | 0.000000000000000E+00 | 0.000000000000000E+00 | 0.000000000000000E+00 | −2.720000000000000E−08 |
| A15 | 0.000000000000000E+00 | 0.000000000000000E+00 | 0.000000000000000E+00 | 0.000000000000000E+00 |
| A16 | 0.000000000000000E+00 | 0.000000000000000E+00 | 0.000000000000000E+00 | 0.000000000000000E+00 |
| A17 | 0.000000000000000E+00 | 0.000000000000000E+00 | 0.000000000000000E+00 | 0.000000000000000E+00 |
| A18 | 0.000000000000000E+00 | 0.000000000000000E+00 | 0.000000000000000E+00 | 0.000000000000000E+00 |
| A19 | 0.000000000000000E+00 | 0.000000000000000E+00 | 0.000000000000000E+00 | 0.000000000000000E+00 |
| A20 | 0.000000000000000E+00 | 0.000000000000000E+00 | 0.000000000000000E+00 | 0.000000000000000E+00 |

|  | S12(L5 1st Surface) | S13(L5 2nd Surface) |
|---|---|---|
| R | −14.66066909 | 11.79359706 |
| K | 0.000000000000000E+00 | 0.000000000000000E+00 |
| A3 | 0.000000000000000E+00 | 0.000000000000000E+00 |
| A4 | 1.298914000000000E−03 | 4.944170000000000E−04 |
| A5 | 0.000000000000000E+00 | 0.000000000000000E+00 |
| A6 | −7.230000000000000E−05 | 3.680000000000000E−05 |
| A7 | 0.000000000000000E+00 | 0.000000000000000E+00 |
| A8 | −6.080000000000000E−06 | 5.460000000000000E−05 |
| A9 | 0.000000000000000E+00 | 0.000000000000000E+00 |
| A10 | 1.710000000000000E−06 | −2.100000000000000E−05 |
| A11 | 0.000000000000000E+00 | 0.000000000000000E+00 |
| A12 | 9.800000000000000E−08 | 4.170000000000000E−06 |
| A13 | 0.000000000000000E+00 | 0.000000000000000E+00 |
| A14 | −1.920000000000000E−08 | −2.820000000000000E−07 |
| A15 | 0.000000000000000E+00 | 0.000000000000000E+00 |
| A16 | 0.000000000000000E+00 | 0.000000000000000E+00 |
| A17 | 0.000000000000000E+00 | 0.000000000000000E+00 |
| A18 | 0.000000000000000E+00 | 0.000000000000000E+00 |
| A19 | 0.000000000000000E+00 | 0.000000000000000E+00 |
| A20 | 0.000000000000000E+00 | 0.000000000000000E+00 |

[Optical System of the Long Focal Length Side]

Figure 16:
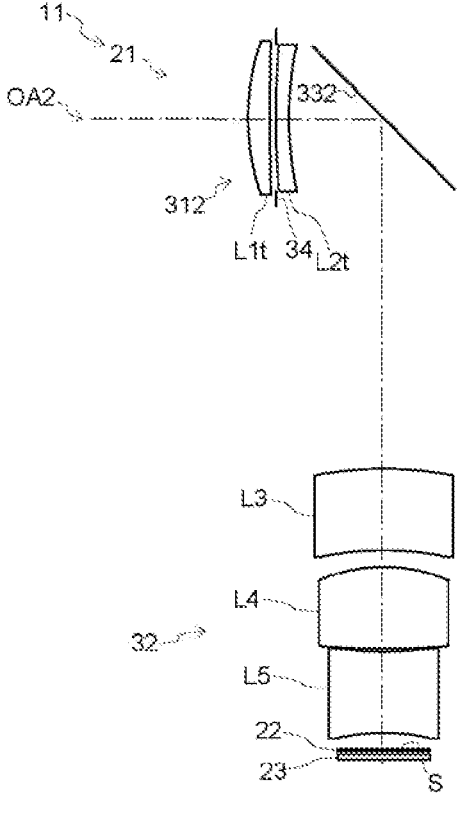
FIG. 16 is a configuration diagram of an optical system of a long focal length side in a camera module according to the fourth example of the present disclosure.

The optical system of the long focal length side in the imaging lens assembly 21 according to the fourth example is shown in FIG. 16. Lens parameters like those in the first example are shown in Tables 32-35.

TABLE 32

| Si | Ri | Di | Ndi | ν di |
|---|---|---|---|---|
| 1(Virtual Surface) | | | | |
| 2(L1t 1st Surface) | 11.754 | 1.285 | 1.5439 | 56.07 |
| 3(L1t 2nd Surface) | 183.131 | 0.300 | | |
| 4(Aperture Stop) | | 0.000 | | |
| 5(L2t 1st Surface) | 32.868 | 0.862 | 1.6349 | 23.97 |
| 6(L2t 2nd Surface) | 15.741 | 4.900 | | |
| 7(Second Mirror) | | 16.459 | | |
| 8(L3 1st Surface) | −18.649 | 4.200 | 1.544 | 56.07 |
| 9(L3 2nd Surface) | −16.960 | 0.859 | | |
| 10(L4 1st Surface) | −8.702 | 4.200 | 1.544 | 56.07 |
| 11(L4 2nd Surface) | 43.701 | 0.179 | | |
| 12(L5 1st Surface) | 14.661 | 4.200 | 1.635 | 23.97 |
| 13(L5 2nd Surface) | −11.794 | 0.800 | | |
| 14(Optical Filter) | | 0.110 | 1.517 | 64.17 |
| 15(Image Plane) | | 0.103 | | |

TABLE 33

| Lens | Focal Length |
|---|---|
| L1t | 23.06 |
| L2t | −48.53 |
| L3 | −3000.00 |
| L4 | 13.75 |
| L5 | −9.70 |
| TLG1 | 40.42 |
| LG2 | −536.77 |

TABLE 34

| | |
|---|---|
| f t | 27.01 |
| Fno | 3.58 |
| 2ω | 10.18 |
| Σ T d | 38.56 |
| Σ TLd1 | 7.35 |
| Σ TLd2 | 31.11 |
| Yh_t | 2.35 |

TABLE 35

| | S2(L1t 1st Surface) | S3(L1t 2nd Surface) | S5(L2t 1st Surface) | S6(L2t 2nd Surface) |
|---|---|---|---|---|
| R | 11.75371138 | 183.1313783 | 32.86760243 | 15.74148565 |
| K | 0.000000000000000E+00 | 0.000000000000000E+00 | 0.000000000000000E+00 | 0.000000000000000E+00 |
| A3 | 0.000000000000000E+00 | 0.000000000000000E+00 | 0.000000000000000E+00 | 0.000000000000000E+00 |
| A4 | 3.506306475575810E−05 | 8.572726225582210E−05 | 1.663400918261620E−05 | 1.535882680990520E−05 |
| A5 | 0.000000000000000E+00 | 0.000000000000000E+00 | 0.000000000000000E+00 | 0.000000000000000E+00 |
| A6 | 5.423039287646360E−06 | 5.108073913547310E−06 | −1.181979575354700E−07 | 3.019506523251880E−06 |
| A7 | 0.000000000000000E+00 | 0.000000000000000E+00 | 0.000000000000000E+00 | 0.000000000000000E+00 |
| A8 | −1.260157445765380E−07 | −2.145732633400540E−07 | 2.638008055971190E−07 | 3.237612375092970E−08 |
| A9 | 0.000000000000000E+00 | 0.000000000000000E+00 | 0.000000000000000E+00 | 0.000000000000000E+00 |
| A10 | −1.426602171154710E−08 | −3.897957451550920E−09 | 1.695357564692600E−09 | 1.618555392787230E−08 |
| A11 | 0.000000000000000E+00 | 0.000000000000000E+00 | 0.000000000000000E+00 | 0.000000000000000E+00 |
| A12 | 9.169244117750140E−10 | 6.217529908661310E−10 | −5.880355983715440E−10 | −1.035791394766260E−09 |
| A13 | 0.000000000000000E+00 | 0.000000000000000E+00 | 0.000000000000000E+00 | 0.000000000000000E+00 |
| A14 | 0.000000000000000E+00 | 0.000000000000000E+00 | 0.000000000000000E+00 | 0.000000000000000E+00 |
| A15 | 0.000000000000000E+00 | 0.000000000000000E+00 | 0.000000000000000E+00 | 0.000000000000000E+00 |
| A16 | 0.000000000000000E+00 | 0.000000000000000E+00 | 0.000000000000000E+00 | 0.000000000000000E+00 |
| A17 | 0.000000000000000E+00 | 0.000000000000000E+00 | 0.000000000000000E+00 | 0.000000000000000E+00 |
| A18 | 0.000000000000000E+00 | 0.000000000000000E+00 | 0.000000000000000E+00 | 0.000000000000000E+00 |
| A19 | 0.000000000000000E+00 | 0.000000000000000E+00 | 0.000000000000000E+00 | 0.000000000000000E+00 |
| A20 | 0.000000000000000E+00 | 0.000000000000000E+00 | 0.000000000000000E+00 | 0.000000000000000E+00 |

| | S8(L3 1st Surface) | S9(L3 2nd Surface) | S10(L4 1st Surface) | S11(L4 2nd Surface) |
|---|---|---|---|---|
| R | 18.64896654 | 16.95974663 | 8.702493241 | −43.70077847 |
| K | 0.000000000000000E+00 | 0.000000000000000E+00 | 0.000000000000000E+00 | 0.000000000000000E+00 |
| A3 | 0.000000000000000E+00 | 0.000000000000000E+00 | 0.000000000000000E+00 | 0.000000000000000E+00 |
| A4 | −6.178710000000000E−05 | 1.039380000000000E−04 | 8.702620000000000E−05 | 5.255620000000000E−04 |
| A5 | 0.000000000000000E+00 | 0.000000000000000E+00 | 0.000000000000000E+00 | 0.000000000000000E+00 |
| A6 | −1.710000000000000E−06 | 5.420000000000000E−06 | 4.310000000000000E−06 | −8.246360000000000E−05 |
| A7 | 0.000000000000000E+00 | 0.000000000000000E+00 | 0.000000000000000E+00 | 0.000000000000000E+00 |
| A8 | 2.710000000000000E−07 | 2.760000000000000E−07 | −2.070000000000000E−07 | −4.150000000000000E−06 |
| A9 | 0.000000000000000E+00 | 0.000000000000000E+00 | 0.000000000000000E+00 | 0.000000000000000E+00 |
| A10 | −1.360000000000000E−08 | 3.730000000000000E−08 | 3.070000000000000E−08 | 5.550000000000000E−07 |
| A11 | 0.000000000000000E+00 | 0.000000000000000E+00 | 0.000000000000000E+00 | 0.000000000000000E+00 |
| A12 | 0.000000000000000E+00 | 0.000000000000000E+00 | 4.590000000000000E−09 | 2.920000000000000E−07 |
| A13 | 0.000000000000000E+00 | 0.000000000000000E+00 | 0.000000000000000E+00 | 0.000000000000000E+00 |
| A14 | 0.000000000000000E+00 | 0.000000000000000E+00 | 0.000000000000000E+00 | −2.720000000000000E−08 |
| A15 | 0.000000000000000E+00 | 0.000000000000000E+00 | 0.000000000000000E+00 | 0.000000000000000E+00 |
| A16 | 0.000000000000000E+00 | 0.000000000000000E+00 | 0.000000000000000E+00 | 0.000000000000000E+00 |
| A17 | 0.000000000000000E+00 | 0.000000000000000E+00 | 0.000000000000000E+00 | 0.000000000000000E+00 |
| A18 | 0.000000000000000E+00 | 0.000000000000000E+00 | 0.000000000000000E+00 | 0.000000000000000E+00 |
| A19 | 0.000000000000000E+00 | 0.000000000000000E+00 | 0.000000000000000E+00 | 0.000000000000000E+00 |
| A20 | 0.000000000000000E+00 | 0.000000000000000E+00 | 0.000000000000000E+00 | 0.000000000000000E+00 |

| | S12(L5 1st Surface) | S13(L5 2nd Surface) |
|---|---|---|
| R | −14.66066909 | 11.79359706 |
| K | 0.000000000000000E+00 | 0.000000000000000E+00 |

TABLE 35-continued

| | | | |
|---|---|---|---|
| A3 | 0.000000000000000E+00 | 0.000000000000000E+00 | |
| A4 | 1.298914000000000E−03 | 4.944170000000000E−04 | |
| A5 | 0.000000000000000E+00 | 0.000000000000000E+00 | |
| A6 | −7.230000000000000E−05 | 3.680000000000000E−05 | |
| A7 | 0.000000000000000E+00 | 0.000000000000000E+00 | |
| A8 | −6.080000000000000E−06 | 5.460000000000000E−05 | |
| A9 | 0.000000000000000E+00 | 0.000000000000000E+00 | |
| A10 | 1.710000000000000E−06 | −2.100000000000000E−05 | |
| A11 | 0.000000000000000E+00 | 0.000000000000000E+00 | |
| A12 | 9.800000000000000E−08 | 4.170000000000000E−06 | |
| A13 | 0.000000000000000E+00 | 0.000000000000000E+00 | |
| A14 | −1.920000000000000E−08 | −2.820000000000000E−07 | |
| A15 | 0.000000000000000E+00 | 0.000000000000000E+00 | |
| A16 | 0.000000000000000E+00 | 0.000000000000000E+00 | |
| A17 | 0.000000000000000E+00 | 0.000000000000000E+00 | |
| A18 | 0.000000000000000E+00 | 0.000000000000000E+00 | |
| A19 | 0.000000000000000E+00 | 0.000000000000000E+00 | |
| A20 | 0.000000000000000E+00 | 0.000000000000000E+00 | |

Table 36 shows values corresponding to the conditional expressions.

TABLE 36

| | |
|---|---|
| (WLG1 + TLG1)/(WLG1 − TLG1) > −15 | −9.79 |
| 3 < (Σ W d + Σ Td)/(Y h_w + Yh_t) < 20 | 14.72 |
| Σ W d/f w < 2.0 | 1.39 |
| Σ T d/f t < 2.0 | 1.43 |
| WLG1/fw < 2.0 | 1.50 |
| WLG1/LG2 < 0 | −0.06 |
| TLG1/LG2 < 0 | −0.08 |
| Σ TLd1/ Σ WLd1 < 2.0 | 0.82 |

Figure 17:
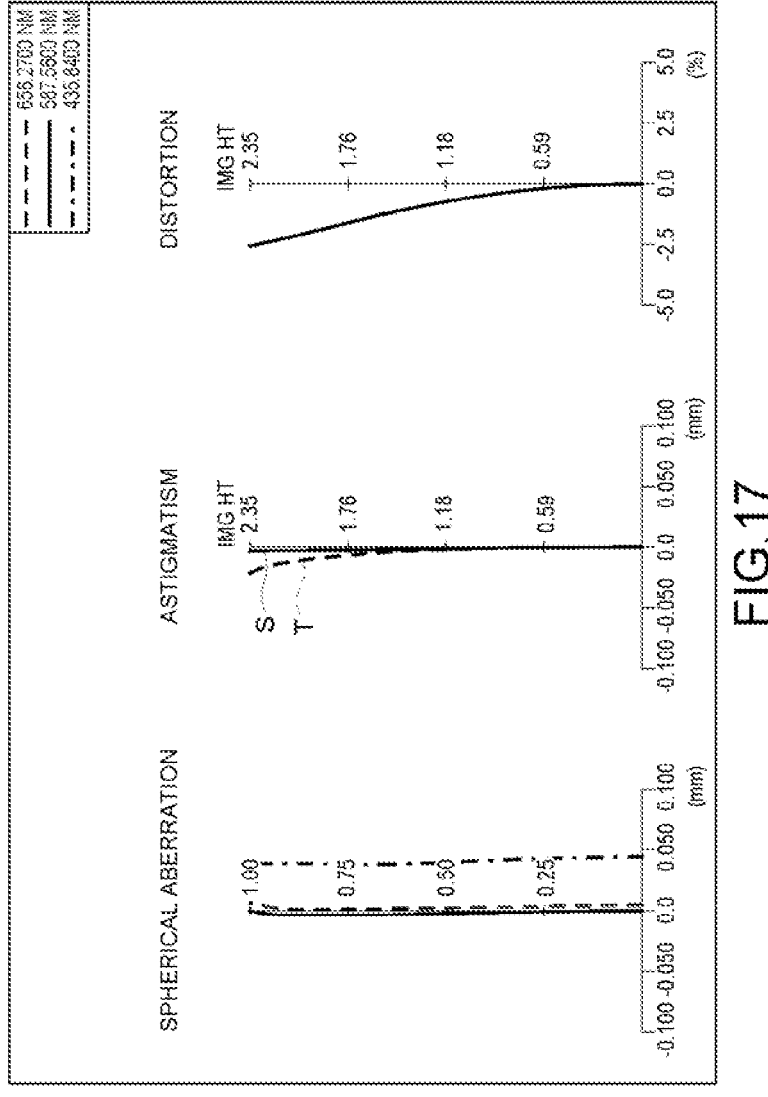
FIG. 17 is an aberration diagram of the optical system of the short focal length side in the camera module according to the fourth example of the present disclosure.
Figure 18:
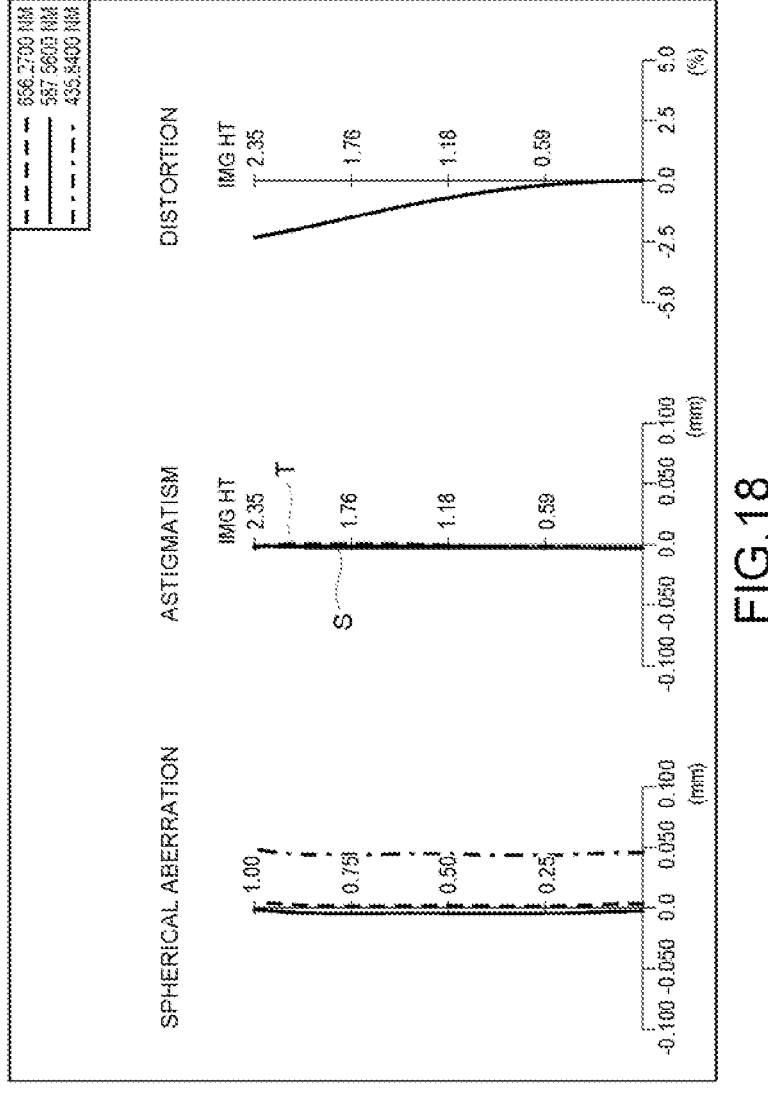
FIG. 18 is an aberration diagram of the optical system of the long focal length side in the camera module according to the fourth example of the present disclosure.

Aberrations of the short focal length side in the fourth example are shown in FIG. 17. Aberrations of the long focal length side in the fourth example are shown in FIG. 18.

According to the fourth example, by making the lens parameters and number of lenses different from those of the first to third examples, the degree of freedom in designing the camera module 11 according to the present disclosure can be further increased while obtaining the same effects as the first example.

Fifth Example

Next, a fifth example, in which specific numerical values are applied to the camera module 11 shown in FIGS. 19 and 20, will be described.

[Optical System of the Short Focal Length Side]

Figure 19:
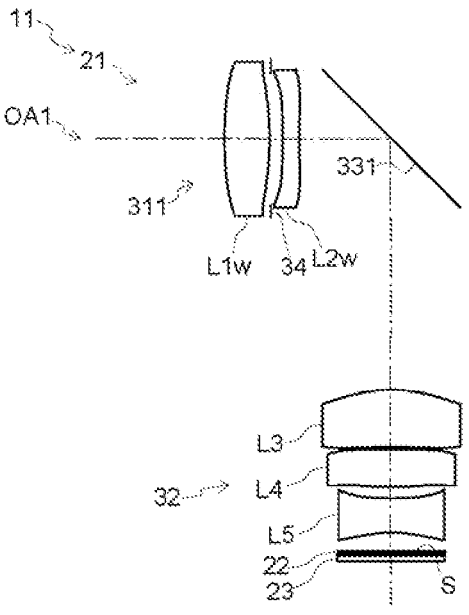
FIG. 19 is a configuration diagram of an optical system of a short focal length side in a camera module according to a fifth example of the present disclosure.

The optical system of the short focal length side in the imaging lens assembly 21 according to the fifth example is shown in FIG. 19.

Lens parameters like those in the first example are shown in Tables 37-40.

TABLE 37

| Si | Ri | Di | Ndi | v di |
|---|---|---|---|---|
| 1(Virtual Surface) | | | | |
| 2(L1w 1st Surface) | 19.870 | 2.000 | 1.5439 | 56.07 |
| 3(L1w 2nd Surface) | −12.401 | 0.050 | | |
| 4(Aperture Stop) | | 0.500 | | |
| 5(L2w 1st Surface) | 152.632 | 0.750 | 1.6349 | 23.97 |
| 6(L2w 2nd Surface) | 16.227 | 4.032 | | |
| 7(First Mirror) | | 11.000 | | |
| 8(L3 1st Surface) | 6.997 | 2.500 | 1.544 | 56.07 |
| 9(L3 2nd Surface) | 31.986 | 0.100 | | |
| 10(L4 1st Surface) | 170.435 | 1.642 | 1.544 | 56.07 |
| 11(L4 2nd Surface) | −14.140 | 0.500 | | |
| 12(L5 1st Surface) | −16.523 | 1.500 | 1.635 | 23.97 |
| 13(L5 2nd Surface) | 5.185 | 0.800 | | |
| 14(Optical Filter) | | 0.110 | 1.517 | 64.17 |
| 15(Image Plane) | | 0.103 | | |

TABLE 38

| Lens | Focal Length |
|---|---|
| L1w | 14.37 |
| L2w | −28.66 |
| L3 | 15.93 |
| L4 | 24.11 |
| L5 | −6.05 |
| WLG1 | 25.96 |
| LG2 | −59.21 |

TABLE 39

| | |
|---|---|
| f w | 18.30 |
| Fno | 2.90 |
| 2ω | 14.21 |
| Σ W d | 25.59 |
| Σ WLd1 | 7.33 |
| Σ WLd2 | 18.25 |
| Yh_w | 2.35 |

TABLE 40

| | S2(L1w 1st Surface) | S3(L1w 2nd Surface) | S5(L2w 1st Surface) | S6(L2w 2nd Surface) |
|---|---|---|---|---|
| R | 19.87043846 | − 12.40095237 | 152.6318451 | 16.22710657 |
| K | 0.000000000000000E+00 | 0.000000000000000E+00 | 0.000000000000000E+00 | 0.000000000000000E+00 |
| A3 | 0.000000000000000E+00 | 0.000000000000000E+00 | 0.000000000000000E+00 | 0.000000000000000E+00 |
| A4 | 1.079827255814100E−03 | 1.845776012550320E−03 | −5.304995116959330E−03 | −6.533273091001680E−03 |
| A5 | 0.000000000000000E+00 | 0.000000000000000E+00 | 0.000000000000000E+00 | 0.000000000000000E+00 |

TABLE 40-continued

| | | | | |
|---|---|---|---|---|
| A6 | −1.477707843995470E−05 | −2.638936666019780E−04 | −1.979913155529830E−04 | 1.269300815580570E−04 |
| A7 | 0.000000000000000E+00 | 0.000000000000000E+00 | 0.000000000000000E+00 | 0.000000000000000E+00 |
| A8 | 3.590062270500460E−06 | 2.169793436112630E−05 | 2.114179555398270E−05 | 6.191661984148620E−06 |
| A9 | 0.000000000000000E+00 | 0.000000000000000E+00 | 0.000000000000000E+00 | 0.000000000000000E+00 |
| A10 | −1.406391271014990E−07 | −4.582828013536710E−07 | 5.782782627131710E−07 | −2.325027983512030E−07 |
| A11 | 0.000000000000000E+00 | 0.000000000000000E+00 | 0.000000000000000E+00 | 0.000000000000000E+00 |
| A12 | 1.639217977577850E−08 | 6.564009706070900E−09 | −9.242846521050940E−08 | −1.332631748926480E−08 |
| A13 | 0.000000000000000E+00 | 0.000000000000000E+00 | 0.000000000000000E+00 | 0.000000000000000E+00 |
| A14 | 0.000000000000000E+00 | 0.000000000000000E+00 | 0.000000000000000E+00 | 0.000000000000000E+00 |
| A15 | 0.000000000000000E+00 | 0.000000000000000E+00 | 0.000000000000000E+00 | 0.000000000000000E+00 |
| A16 | 0.000000000000000E+00 | 0.000000000000000E+00 | 0.000000000000000E+00 | 0.000000000000000E+00 |
| A17 | 0.000000000000000E+00 | 0.000000000000000E+00 | 0.000000000000000E+00 | 0.000000000000000E+00 |
| A18 | 0.000000000000000E+00 | 0.000000000000000E+00 | 0.000000000000000E+00 | 0.000000000000000E+00 |
| A19 | 0.000000000000000E+00 | 0.000000000000000E+00 | 0.000000000000000E+00 | 0.000000000000000E+00 |
| A20 | 0.000000000000000E+00 | 0.000000000000000E+00 | 0.000000000000000E+00 | 0.000000000000000E+00 |

| | S8(L3 1st Surface) | S9(L3 2nd Surface) | S10(L4 1st Surface) | S11(L4 2nd Surface) |
|---|---|---|---|---|
| R | 6.996888019 | 31.98563547 | 170.4354332 | − 14.14044333 |
| K | 0.000000000000000E+00 | 0.000000000000000E+00 | 0.000000000000000E+00 | 0.000000000000000E+00 |
| A3 | 0.000000000000000E+00 | 0.000000000000000E+00 | 0.000000000000000E+00 | 0.000000000000000E+00 |
| A4 | −9.408250000000000E−05 | −9.714370000000000E−04 | 1.530323000000000E−03 | 4.767856000000000E−03 |
| A5 | 0.000000000000000E+00 | 0.000000000000000E+00 | 0.000000000000000E+00 | 0.000000000000000E+00 |
| A6 | −5.550120000000000E−05 | −6.405270000000000E−05 | 1.407600000000000E−04 | −2.500730000000000E−04 |
| A7 | 0.000000000000000E+00 | 0.000000000000000E+00 | 0.000000000000000E+00 | 0.000000000000000E+00 |
| A8 | −3.450000000000000E−07 | 1.900000000000000E−06 | 6.550000000000000E−06 | 3.484870000000000E−05 |
| A9 | 0.000000000000000E+00 | 0.000000000000000E+00 | 0.000000000000000E+00 | 0.000000000000000E+00 |
| A10 | −6.280000000000000E−07 | −8.260000000000000E−07 | 1.630000000000000E−06 | 3.260000000000000E−06 |
| A11 | 0.000000000000000E+00 | 0.000000000000000E+00 | 0.000000000000000E+00 | 0.000000000000000E+00 |
| A12 | 0.000000000000000E+00 | 0.000000000000000E+00 | −7.110000000000000E−08 | −5.630000000000000E−07 |
| A13 | 0.000000000000000E+00 | 0.000000000000000E+00 | 0.000000000000000E+00 | 0.000000000000000E+00 |
| A14 | 0.000000000000000E+00 | 0.000000000000000E+00 | 0.000000000000000E+00 | 3.650000000000000E−08 |
| A15 | 0.000000000000000E+00 | 0.000000000000000E+00 | 0.000000000000000E+00 | 0.000000000000000E+00 |
| A16 | 0.000000000000000E+00 | 0.000000000000000E+00 | 0.000000000000000E+00 | 0.000000000000000E+00 |
| A17 | 0.000000000000000E+00 | 0.000000000000000E+00 | 0.000000000000000E+00 | 0.000000000000000E+00 |
| A18 | 0.000000000000000E+00 | 0.000000000000000E+00 | 0.000000000000000E+00 | 0.000000000000000E+00 |
| A19 | 0.000000000000000E+00 | 0.000000000000000E+00 | 0.000000000000000E+00 | 0.000000000000000E+00 |
| A20 | 0.000000000000000E+00 | 0.000000000000000E+00 | 0.000000000000000E+00 | 0.000000000000000E+00 |

| | S12(L5 1st Surface) | S13(L5 2nd Surface) |
|---|---|---|
| R | −16.52339206 | 5.184718273 |
| K | 0.000000000000000E+00 | 0.000000000000000E+00 |
| A3 | 0.000000000000000E+00 | 0.000000000000000E+00 |
| A4 | −6.953134000000000E−03 | −1.029411900000000E−02 |
| A5 | 0.000000000000000E+00 | 0.000000000000000E+00 |
| A6 | −4.398090000000000E−05 | 5.415210000000000E−04 |
| A7 | 0.000000000000000E+00 | 0.000000000000000E+00 |
| A8 | 1.764830000000000E−05 | 4.194880000000000E−05 |
| A9 | 0.000000000000000E+00 | 0.000000000000000E+00 |
| A10 | −3.770000000000000E−07 | −2.050270000000000E−05 |
| A11 | 0.000000000000000E+00 | 0.000000000000000E+00 |
| A12 | −6.180000000000000E−07 | 2.980000000000000E−06 |
| A13 | 0.000000000000000E+00 | 0.000000000000000E+00 |
| A14 | −8.930000000000000E−09 | −1.770000000000000E−07 |
| A15 | 0.000000000000000E+00 | 0.000000000000000E+00 |
| A16 | 0.000000000000000E+00 | 0.000000000000000E+00 |
| A17 | 0.000000000000000E+00 | 0.000000000000000E+00 |
| A18 | 0.000000000000000E+00 | 0.000000000000000E+00 |
| A19 | 0.000000000000000E+00 | 0.000000000000000E+00 |
| A20 | 0.000000000000000E+00 | 0.000000000000000E+00 |

[Optical System of the Long Focal Length Side]

Figure 20:
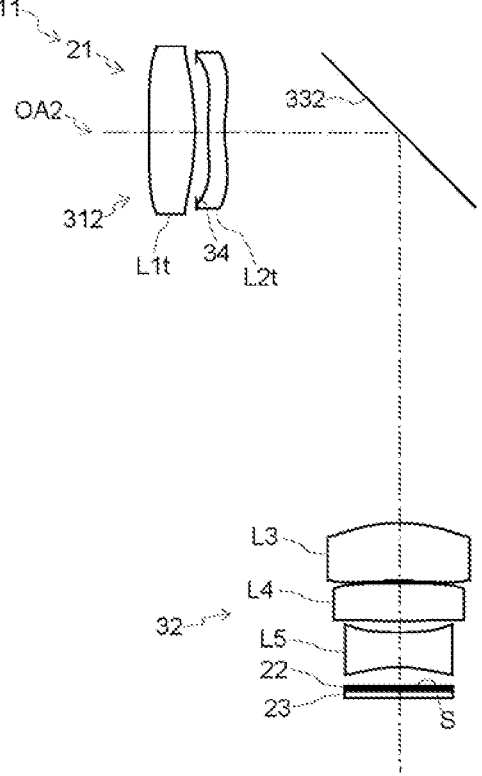
FIG. 20 is a configuration diagram of an optical system of a long focal length side in a camera module according to the fifth example of the present disclosure.

The optical system of the long focal length side in the imaging lens assembly 21 according to the fifth example is shown in FIG. 20.

Lens parameters like those in the first example are shown in Tables 41-44.

TABLE 41

| Si | Ri | Di | Ndi | ν di |
|---|---|---|---|---|
| 1(Virtual Surface) | | | | |
| 2(L1t 1st Surface) | −540.122 | 2.000 | 1.5439 | 56.07 |
| 3(L1t 2nd Surface) | −10.104 | 0.050 | | |

TABLE 41-continued

| Si | Ri | Di | Ndi | ν di |
|---|---|---|---|---|
| 4(Aperture Stop) | | 0.500 | | |
| 5(L2t 1st Surface) | 11.256 | 0.750 | 1.6349 | 23.97 |
| 6(L2t 2nd Surface) | 7.373 | 7.595 | | |
| 7(Second Mirror) | | 17.000 | | |
| 8(L3 1st Surface) | 6.997 | 2.500 | 1.544 | 56.07 |
| 9(L3 2nd Surface) | 31.986 | 0.100 | | |
| 10(L4 1st Surface) | 170.435 | 1.642 | 1.544 | 56.07 |
| 11(L4 2nd Surface) | −14.140 | 0.500 | | |

TABLE 41-continued

| Si | Ri | Di | Ndi | ν di |
|---|---|---|---|---|
| 12(L5 1st Surface) | −16.523 | 1.500 | 1.635 | 23.97 |
| 13(L5 2nd Surface) | 5.185 | 0.800 | | |
| 14(Optical Filter) | | 0.110 | 1.517 | 64.17 |
| 15(Image Plane) | | 0.103 | | |

TABLE 42

| Lens | Focal Length |
|---|---|
| L1t | 18.93 |
| L2t | −36.38 |
| L3 | 15.93 |
| L4 | 24.11 |
| L5 | −6.05 |

TABLE 42-continued

| Lens | Focal Length |
|---|---|
| TLG1 | 35.47 |
| LG2 | −59.21 |

TABLE 43

| f t | 25.00 |
|---|---|
| Fno | 4.03 |
| 2ω | 10.27 |
| Σ T d | 35.15 |
| Σ TLd1 | 10.89 |
| Σ TLd2 | 24.25 |
| Yh_t | 2.35 |

TABLE 44

| | S2(L1t 1st Surface) | S3(L1t 2nd Surface) | S5(L2t 1st Surface) | S6(L2t 2nd Surface) |
|---|---|---|---|---|
| R | −540.1224016 | −10.10406671 | 11.25637551 | 7.372547643 |
| K | 0.000000000000000E+00 | 0.000000000000000E+00 | 0.000000000000000E+00 | 0.000000000000000E+00 |
| A3 | 0.000000000000000E+00 | 0.000000000000000E+00 | 0.000000000000000E+00 | 0.000000000000000E+00 |
| A4 | 2.123337578501120E−03 | 3.420718935327780E−03 | −7.472712837416060E−03 | −1.049077635297760E−02 |
| A5 | 0.000000000000000E+00 | 0.000000000000000E+00 | 0.000000000000000E+00 | 0.000000000000000E+00 |
| A6 | −4.389371213594570E−05 | −3.890975462755440E−04 | −3.520341959481720E−04 | 1.661287579400490E−04 |
| A7 | 0.000000000000000E+00 | 0.000000000000000E+00 | 0.000000000000000E+00 | 0.000000000000000E+00 |
| A8 | −4.230702849423890E−07 | 1.908106555440010E−05 | 1.626894358104190E−05 | 8.060127877720740E−06 |
| A9 | 0.000000000000000E+00 | 0.000000000000000E+00 | 0.000000000000000E+00 | 0.000000000000000E+00 |
| A10 | 1.599966214128580E−07 | −2.578002825849260E−07 | 1.124282709784000E−06 | −3.821862032942680E−07 |
| A11 | 0.000000000000000E+00 | 0.000000000000000E+00 | 0.000000000000000E+00 | 0.000000000000000E+00 |
| A12 | 4.795084688294490E−09 | 7.147276419801570E−09 | −6.031440182882100E−08 | 3.184946399799500E−09 |
| A13 | 0.000000000000000E+00 | 0.000000000000000E+00 | 0.000000000000000E+00 | 0.000000000000000E+00 |
| A14 | 0.000000000000000E+00 | 0.000000000000000E+00 | 0.000000000000000E+00 | 0.000000000000000E+00 |
| A15 | 0.000000000000000E+00 | 0.000000000000000E+00 | 0.000000000000000E+00 | 0.000000000000000E+00 |
| A16 | 0.000000000000000E+00 | 0.000000000000000E+00 | 0.000000000000000E+00 | 0.000000000000000E+00 |
| A17 | 0.000000000000000E+00 | 0.000000000000000E+00 | 0.000000000000000E+00 | 0.000000000000000E+00 |
| A18 | 0.000000000000000E+00 | 0.000000000000000E+00 | 0.000000000000000E+00 | 0.000000000000000E+00 |
| A19 | 0.000000000000000E+00 | 0.000000000000000E+00 | 0.000000000000000E+00 | 0.000000000000000E+00 |
| A20 | 0.000000000000000E+00 | 0.000000000000000E+00 | 0.000000000000000E+00 | 0.000000000000000E+00 |

| | S8(L3 1st Surface) | S9(L3 2nd Surface) | S10(L4 1st Surface) | S11(L4 2nd Surface) |
|---|---|---|---|---|
| R | 6.996888019 | 31.98563547 | 170.4354332 | −14.14044333 |
| K | 0.000000000000000E+00 | 0.000000000000000E+00 | 0.000000000000000E+00 | 0.000000000000000E+00 |
| A3 | 0.000000000000000E+00 | 0.000000000000000E+00 | 0.000000000000000E+00 | 0.000000000000000E+00 |
| A4 | −9.408250000000000E−05 | −9.714370000000000E−04 | 1.530323000000000E−03 | 4.767856000000000E−03 |
| A5 | 0.000000000000000E+00 | 0.000000000000000E+00 | 0.000000000000000E+00 | 0.000000000000000E+00 |
| A6 | −5.550120000000000E−05 | −6.405270000000000E−05 | 1.407600000000000E−04 | −2.500730000000000E−04 |
| A7 | 0.000000000000000E+00 | 0.000000000000000E+00 | 0.000000000000000E+00 | 0.000000000000000E+00 |
| A8 | −3.450000000000000E−07 | 1.900000000000000E−06 | 6.550000000000000E−06 | 3.484870000000000E−05 |
| A9 | 0.000000000000000E+00 | 0.000000000000000E+00 | 0.000000000000000E+00 | 0.000000000000000E+00 |
| A10 | −6.280000000000000E−07 | −8.260000000000000E−07 | 1.630000000000000E−06 | 3.260000000000000E−06 |
| A11 | 0.000000000000000E+00 | 0.000000000000000E+00 | 0.000000000000000E+00 | 0.000000000000000E+00 |
| A12 | 0.000000000000000E+00 | 0.000000000000000E+00 | −7.110000000000000E−08 | −5.630000000000000E−07 |
| A13 | 0.000000000000000E+00 | 0.000000000000000E+00 | 0.000000000000000E+00 | 0.000000000000000E+00 |
| A14 | 0.000000000000000E+00 | 0.000000000000000E+00 | 0.000000000000000E+00 | 3.650000000000000E−08 |
| A15 | 0.000000000000000E+00 | 0.000000000000000E+00 | 0.000000000000000E+00 | 0.000000000000000E+00 |
| A16 | 0.000000000000000E+00 | 0.000000000000000E+00 | 0.000000000000000E+00 | 0.000000000000000E+00 |
| A17 | 0.000000000000000E+00 | 0.000000000000000E+00 | 0.000000000000000E+00 | 0.000000000000000E+00 |
| A18 | 0.000000000000000E+00 | 0.000000000000000E+00 | 0.000000000000000E+00 | 0.000000000000000E+00 |
| A19 | 0.000000000000000E+00 | 0.000000000000000E+00 | 0.000000000000000E+00 | 0.000000000000000E+00 |
| A20 | 0.000000000000000E+00 | 0.000000000000000E+00 | 0.000000000000000E+00 | 0.000000000000000E+00 |

| | S12(L5 1st Surface) | S13(L5 2nd Surface) |
|---|---|---|
| R | −16.52339206 | 5.184718273 |
| K | 0.000000000000000E+00 | 0.000000000000000E+00 |
| A3 | 0.000000000000000E+00 | 0.000000000000000E+00 |
| A4 | −6.953134000000000E−03 | −1.029411900000000E−02 |
| A5 | 0.000000000000000E+00 | 0.000000000000000E+00 |
| A6 | −4.398090000000000E−05 | 5.415210000000000E−04 |
| A7 | 0.000000000000000E+00 | 0.000000000000000E+00 |
| A8 | 1.764830000000000E−05 | 4.194880000000000E−05 |
| A9 | 0.000000000000000E+00 | 0.000000000000000E+00 |

TABLE 44-continued

| | | |
|---|---|---|
| A10 | −3.770000000000000E−07 | −2.050270000000000E−05 |
| A11 | 0.000000000000000E+00 | 0.000000000000000E+00 |
| A12 | −6.180000000000000E−07 | 2.980000000000000E−06 |
| A13 | 0.000000000000000E+00 | 0.000000000000000E+00 |
| A14 | −8.930000000000000E−09 | −1.770000000000000E−07 |
| A15 | 0.000000000000000E+00 | 0.000000000000000E+00 |
| A16 | 0.000000000000000E+00 | 0.000000000000000E+00 |
| A17 | 0.000000000000000E+00 | 0.000000000000000E+00 |
| A18 | 0.000000000000000E+00 | 0.000000000000000E+00 |
| A19 | 0.000000000000000E+00 | 0.000000000000000E+00 |
| A20 | 0.000000000000000E+00 | 0.000000000000000E+00 |

Table 45 shows values corresponding to the conditional expressions.

TABLE 45

| | |
|---|---|
| $(WLG1 + TLG1)/(WLG1 − TLG1) > −15$ | −6.46 |
| $3 < (\Sigma\ W\ d + \Sigma\ Td)/(Y\ h\_w + Yh\_t) < 20$ | 12.92 |
| $\Sigma\ W\ d/f\ w < 2.0$ | 1.40 |
| $\Sigma\ T\ d/f\ t < 2.0$ | 1.41 |
| $WLG1/fw < 2.0$ | 1.42 |
| $WLG1/LG2 < 0$ | −0.44 |
| $TLG1/LG2 < 0$ | −0.60 |
| $\Sigma\ TLd1/\ \Sigma\ WLd1 < 2.0$ | 1.49 |

Figure 21:
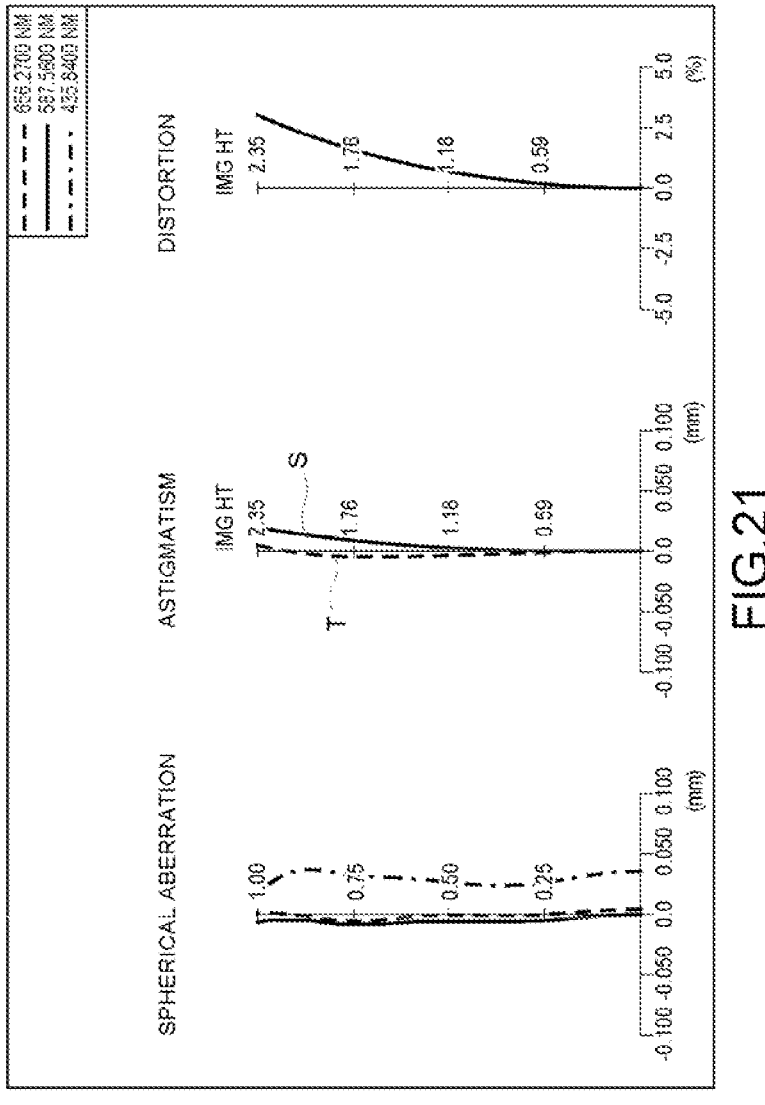
FIG. 21 is an aberration diagram of the optical system of the short focal length side in the camera module according to the fifth example of the present disclosure.
Figure 22:
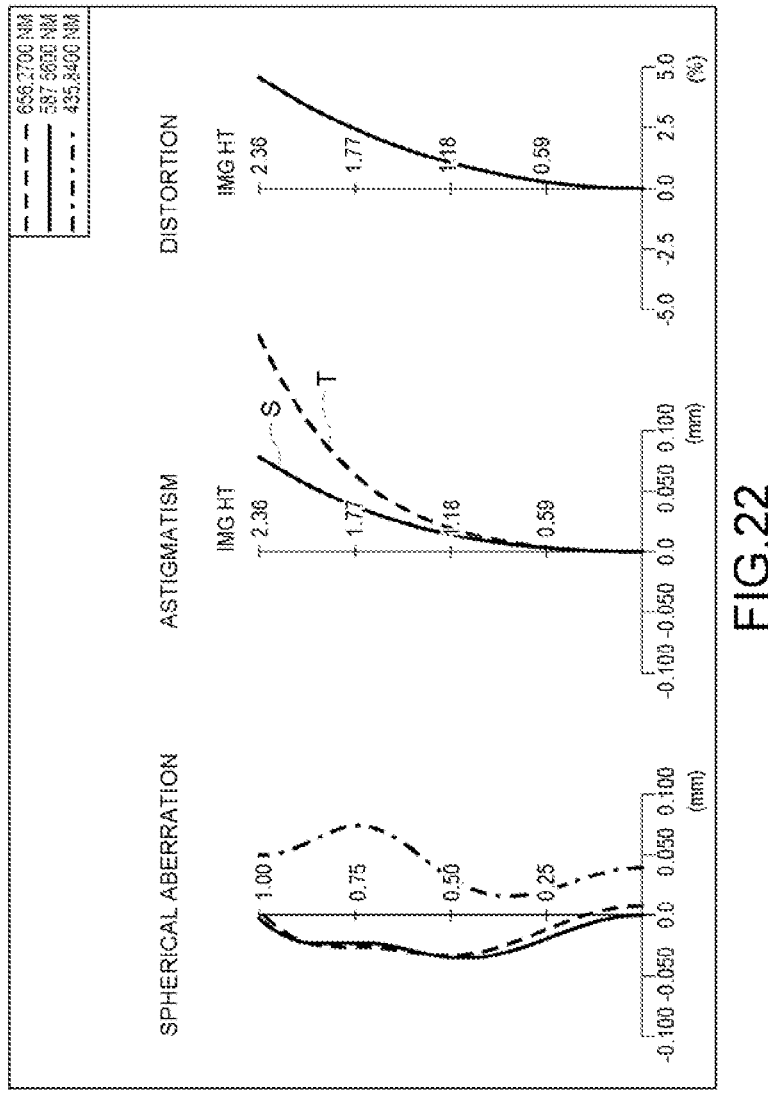
FIG. 22 is an aberration diagram of the optical system of the long focal length side in the camera module according to the fifth example of the present disclosure.

Aberrations of the short focal length side in the fifth example are shown in FIG. 21. Aberrations of the long focal length side in the fifth example are shown in FIG. 22.

According to the fifth example, by making the lens parameters and/or number of lenses different from those of the first to fourth examples, the degree of freedom in designing the camera module 11 according to the present disclosure can be further increased while obtaining the same effects as the first example.

In the description of embodiments of the present disclosure, it is to be understood that terms such as "central", "longitudinal", "transverse", "length", "width", "thickness", "upper", "lower", "front", "rear", "back", "left", "right", "vertical", "horizontal", "top", "bottom", "inner", "outer", "clockwise" and "counterclockwise" should be construed to refer to the orientation or the position as described or as shown in the drawings in discussion. These relative terms are only used to simplify the description of the present disclosure, and do not indicate or imply that the device or element referred to must have a particular orientation, or must be constructed or operated in a particular orientation. Thus, these terms cannot be constructed to limit the present disclosure.

In addition, terms such as "first" and "second" are used herein for purposes of description and are not intended to indicate or imply relative importance or significance or to imply the number of indicated technical features. Thus, a feature defined as "first" and "second" may comprise one or more of this feature. In the description of the present disclosure, "a plurality of" means "two or more than two", unless otherwise specified.

In the description of embodiments of the present disclosure, unless specified or limited otherwise, the terms "mounted", "connected", "coupled" and the like are used broadly, and may be, for example, fixed connections, detachable connections, or integral connections; may also be mechanical or electrical connections; may also be direct connections or indirect connections via intervening structures; may also be inner communications of two elements which can be understood by those skilled in the art according to specific situations.

In the embodiments of the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are in contact via an additional feature formed therebetween. Furthermore, a first feature "on", "above" or "on top of" a second feature may include an embodiment in which the first feature is orthogonally or obliquely "on", "above" or "on top of" the second feature, or just means that the first feature is at a height higher than that of the second feature; while a first feature "below", "under" or "on bottom of" a second feature may include an embodiment in which the first feature is orthogonally or obliquely "below", "under" or "on bottom of" the second feature, or just means that the first feature is at a height lower than that of the second feature.

Various embodiments and examples are provided in the above description to implement different structures of the present disclosure. In order to simplify the present disclosure, certain elements and settings are described in the above. However, these elements and settings are only by way of example and are not intended to limit the present disclosure. In addition, reference numbers and/or reference letters may be repeated in different examples in the present disclosure. This repetition is for the purpose of simplification and clarity and does not refer to relations between different embodiments and/or settings. Furthermore, examples of different processes and materials are provided in the present disclosure. However, it would be appreciated by those skilled in the art that other processes and/or materials may also be applied.

Reference throughout this specification to "an embodiment", "some embodiments", "an exemplary embodiment", "an example", "a specific example" or "some examples" means that a particular feature, structure, material, or characteristics described in connection with the embodiment or example is included in at least one embodiment or example of the present disclosure. Thus, the appearances of the above phrases throughout this specification are not necessarily referring to the same embodiment or example of the present disclosure. Furthermore, the particular features, structures, materials, or characteristics may be combined in any suitable manner in one or more embodiments or examples.

Although embodiments of the present disclosure have been shown and described, it should be appreciated by those skilled in the art that the embodiments are explanatory and cannot be construed to limit the present disclosure, and changes, modifications, alternatives and variations can be made in the embodiments without departing from the scope of the present disclosure.

The invention claimed is:

1. An imaging lens assembly, comprising:
a first lens group;
a second lens group;
a third lens group; and
a mirror assembly, configured to form an optical path optically connecting the first lens group and the third lens group, or form an optical path optically connecting the second lens group and the third lens group;
wherein a focal length of an optical system comprising the first lens group and the third lens group is less than a focal length of an optical system comprising the second lens group and the third lens group;
wherein the imaging lens assembly is configured so that at least one of the following is satisfied:

$$3 < (\Sigma Wd + \Sigma Td)/(Yh\_w + Yh\_t) < 20;$$

$$\Sigma Wd/fw < 2.0;$$

$$\Sigma Td/ft < 2.0;$$

$$WLG1/fw < 2.0;$$

$$WLG1/LG2 < 0;$$

$$TLG1/LG2 < 0; \text{ or}$$

$$\Sigma TLd1/\Sigma WLd1 < 2.0;$$

where $\Sigma Wd$ is a distance on a first optical axis of the imaging lens assembly from a vertex of an object side surface of a most object side disposed lens of the first lens group to an imaging surface, the first optical axis comprising an optical axis of the first lens group and an optical axis of the third lens group that are continuous with each other at an intersection with a first mirror of the mirror assembly, $\Sigma Td$ is a distance on a second optical axis of the imaging lens assembly from a vertex of an object side surface of a most object side disposed lens of the second lens group to an imaging surface, the second optical axis comprising an optical axis of the second lens group and the optical axis of the third lens group that are continuous with each other at an intersection with a second mirror of the mirror assembly, $Yh\_w$ is an image height of the short focal length side, $Yh\_t$ is an image height of the long focal length side, $fw$ is a focal length of the imaging lens assembly of the short focal length side, $ft$ is a focal length of the imaging lens assembly of the long focal length side, $WLG1$ is a focal length of the first lens group, $LG2$ is a focal length of the third lens group, $TLG1$ is a focal length of the second lens group, $\Sigma TLd1$ is a distance on an optical axis of the second lens group from a vertex of an object side surface of a most object side disposed lens of the second lens group to the second mirror, and $\Sigma WLd1$ is a distance on an optical axis of the first lens group from a vertex of an object side surface of a most object side disposed lens of the first lens group to the first mirror; and wherein
the first mirror is positioned between the first lens group and the third lens group; and
the second mirror is positioned between the second lens group and the third lens group.

2. The imaging lens assembly according to claim 1, wherein
the first mirror is configured to form an optical path optically connecting the first lens group and the third lens group, by tilting with respect to both of an optical axis direction of the first lens group and an optical axis direction of the third lens group when the shooting state is a state of shooting at the short focal length, and
the first mirror is configured not to interfere in an optical path optically connecting the second lens group and the third lens group, by maintaining a state of being substantially perpendicular to the optical axis direction of the first lens group when the shooting state is a state of shooting at the long focal length.

3. The imaging lens assembly according to claim 1, wherein
each of the first lens group and the second lens group comprises at least one lens having a positive refractive power, and
the third lens group comprises at least one lens having a negative refractive power.

4. The imaging lens assembly according to claim 1, further configured so that:

$$(WLG1 + TLG1)/(WLG1 - TLG1) > -15,$$

where WLG1 is a focal length of the first lens group and TLG1 is a focal length of the second lens group.

5. The imaging lens assembly according to claim 1, wherein the first lens group and the second lens group are positioned parallel to the optical axis of the third lens group in the lens storage state.

6. The imaging lens assembly according to claim 1, wherein optical axis directions of the first lens group and the second lens group are substantially perpendicular to the optical axis direction of the third lens group.

7. The imaging lens assembly according to claim 1, wherein
the first mirror is rotatable about one end on the third lens group side of the first mirror, and
the second mirror is rotatable about one end on the third lens group side of the second mirror.

8. The imaging lens assembly according to claim 1, wherein the second lens group is disposed farther from an imaging surface than the first lens group.

9. The imaging lens assembly according to claim 1, wherein
the shooting at the short focal length is a wide-angle shooting, and
the shooting at the long focal length is a telephoto shooting.

10. A camera module, comprising:
an imaging lens assembly, having a first shooting state, a second shooting state, and a lens storage state, the second shooting state having a focus length longer than that of the first shooting state, and the imaging lens assembly comprising:
a first lens group;
a second lens group;
a third lens group; and
a mirror assembly, configured to form an optical path optically connecting the first lens group and the third lens group or form an optical path optically connecting the second lens group and the third lens group;
wherein a focal length of an optical system comprising the first lens group and the third lens group is less than a focal length of an optical system comprising the second lens group and the third lens group;
wherein the imaging lens assembly is configured so that at least one of the following is satisfied:

$$3 < (\Sigma Wd + \Sigma Td)/(Yh\_w + Yh\_t) < 20;$$

$$\Sigma Wd/fw < 2.0;$$

$\Sigma Td/f < 2.0;$ $WLG1/fw < 2.0.$ $WLG1/LG2 < 0;$ $TLG1/LG2 < 0;$ or $\Sigma TLd1/\Sigma WLd1 < 2.0;$ where $\Sigma$Wd is a distance on a first optical axis of the imaging lens assembly from a vertex of an object side surface of a most object side disposed lens of the first lens group to an imaging surface, the first optical axis comprising an optical axis of the first lens group and an optical axis of the third lens group that are continuous with each other at an intersection with a first mirror of the mirror assembly, $\Sigma$Td is a distance on a second optical axis of the imaging lens assembly from a vertex of an object side surface of a most object side disposed lens of the second lens group to an imaging surface, the second optical axis comprising an optical axis of the second lens group and the optical axis of the third lens group that are continuous with each other at an intersection with a second mirror of the mirror assembly, Yh_w is an image height of the short focal length side, Yh_t is an image height of the long focal length side, fw is a focal length of the imaging lens assembly of the short focal length side, ft is a focal length of the imaging lens assembly of the long focal length side, WLG1 is a focal length of the first lens group, LG2 is a focal length of the third lens group, TLG1 is a focal length of the second lens group, $\Sigma$TLd1 is a distance on an optical axis of the second lens group from a vertex of an object side surface of a most object side disposed lens of the second lens group to the second mirror, and $\Sigma$WLd1 is a distance on an optical axis of the first lens group from a vertex of an object side surface of a most object side disposed lens of the first lens group to the first mirror; and wherein the first mirror is positioned between the first lens group and the third lens group; and the second mirror is positioned between the second lens group and the third lens group; and an image sensor comprising an imaging surface.

11. The camera module according to claim 10, wherein each of the first lens group and the second lens group comprises at least one lens having a positive refractive power, and the third lens group comprises at least one lens having a negative refractive power.

12. The camera module according to claim 10, further comprising an IR filter disposed between the imaging lens assembly and the image sensor.

13. An imaging device, comprising:

a camera module, comprising:

an imaging lens assembly, comprising:

a first lens group;

a second lens group;

a third lens group; and a mirror assembly, configured to form an optical path optically connecting the first lens group and the third lens group, or form an optical path optically connecting the second lens group and the third lens group;

wherein a focal length of an optical system comprising the first lens group and the third lens group is less than a focal length of an optical system comprising the second lens group and the third lens group;

wherein the imaging lens assembly is configured so that at least one of the following is satisfied:

$3 < (> Wd + \Sigma Td)/(Yh\_w + Yh\_t) < 20;$ $\Sigma Wd/fw < 2.0;$ $\Sigma Td/ft < 2.0;$ $WLG1/fw < 2.0;$ $WLG1/LG2 < 0;$ $TLG1/LG2 < 0;$ or $\Sigma TLd1/\Sigma WLd1 < 2.0;$ where $\Sigma$Wd is a distance on a first optical axis of the imaging lens assembly from a vertex of an object side surface of a most object side disposed lens of the first lens group to an imaging surface, the first optical axis comprising an optical axis of the first lens group and an optical axis of the third lens group that are continuous with each other at an intersection with a first mirror of the mirror assembly, $\Sigma$Td is a distance on a second optical axis of the imaging lens assembly from a vertex of an object side surface of a most object side disposed lens of the second lens group to an imaging surface, the second optical axis comprising an optical axis of the second lens group and the optical axis of the third lens group that are continuous with each other at an intersection with a second mirror of the mirror assembly, Yh_w is an image height of the short focal length side, Yh_t is an image height of the long focal length side, fw is a focal length of the imaging lens assembly of the short focal length side, ft is a focal length of the imaging lens assembly of the long focal length side, WLG1 is a focal length of the first lens group, LG2 is a focal length of the third lens group, TLG1 is a focal length of the second lens group, $\Sigma$TLd1 is a distance on an optical axis of the second lens group from a vertex of an object side surface of a most object side disposed lens of the second lens group to the second mirror, and $\Sigma$WLd1 is a distance on an optical axis of the first lens group from a vertex of an object side surface of a most object side disposed lens of the first lens group to the first mirror; and wherein the first mirror is positioned between the first lens group and the third lens group; and the second mirror is positioned between the second lens group and the third lens group; and an image sensor comprising an imaging surface; and a housing for storing the imaging lens assembly.

\*　\*　\*　\*　\*